(12) United States Patent
Kato et al.

(10) Patent No.: US 8,622,420 B2
(45) Date of Patent: Jan. 7, 2014

(54) CURTAIN AIRBAG APPARATUS

(75) Inventors: Hideki Kato, Nissin (JP); Yosuke Shimizu, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/367,928

(22) Filed: Feb. 7, 2012

(65) Prior Publication Data

US 2012/0200069 A1 Aug. 9, 2012

(30) Foreign Application Priority Data

Feb. 7, 2011 (JP) ................................ 2011-024309

(51) Int. Cl.
*B60R 21/232* (2011.01)

(52) U.S. Cl.
USPC ..................... 280/730.2; 280/736; 280/742

(58) Field of Classification Search
CPC ..................................................... B60R 21/232
USPC ...................................... 280/730.2, 736, 742
See application file for complete search history.

(56) References Cited

U.S. PATENT DOCUMENTS

| | | | |
|---|---|---|---|
| 6,386,581 B1 | 5/2002 | Ohno | |
| 6,932,386 B2 | 8/2005 | Ikeda et al. | |
| 7,052,037 B2 * | 5/2006 | Nakayasu et al. | 280/730.2 |
| 7,163,230 B2 * | 1/2007 | O'Loughlin et al. | 280/730.2 |
| 7,380,820 B2 * | 6/2008 | O'Loughlin et al. | 280/736 |
| 7,481,454 B2 * | 1/2009 | Sunabashiri | 280/740 |
| 7,618,057 B2 * | 11/2009 | Pinsenschaum et al. | 280/730.2 |
| 7,775,553 B2 * | 8/2010 | Takemura et al. | 280/730.2 |
| 7,883,108 B2 * | 2/2011 | Robinette et al. | 280/736 |
| 2006/0022439 A1 * | 2/2006 | Bayley et al. | 280/729 |
| 2007/0138778 A1 * | 6/2007 | Takemura et al. | 280/743.1 |

FOREIGN PATENT DOCUMENTS

| | | |
|---|---|---|
| GB | 2350332 A | 11/2000 |
| JP | 2000335355 A | 12/2000 |
| JP | 2001-171469 A | 6/2001 |
| JP | 2001-171471 A | 6/2001 |
| JP | 2002-225670 A | 8/2002 |
| JP | 2004299483 A | 10/2004 |
| JP | 3755340 B | 3/2006 |
| JP | 2007-161167 A | 6/2007 |
| JP | 3966777 B | 8/2007 |
| JP | 4019896 B | 12/2007 |
| JP | 2009292348 A | 12/2009 |
| JP | 2010-143528 A | 7/2010 |

* cited by examiner

*Primary Examiner* — Paul N Dickson
*Assistant Examiner* — Timothy Wilhelm
(74) *Attorney, Agent, or Firm* — Gifford, Krass, Sprinkle, Anderson & Citkowski, P.C.

(57) ABSTRACT

A curtain airbag apparatus is provided with a curtain airbag that is embedded, in a folded or rolled state, in an upper edge portion of at least one door opening and deploys into a form of a curtain, the curtain airbag having: a first deployment portion deploying downward by inflating with gas supplied from upon a side collision and rollover of the vehicle; a second deployment portion deploying downward by inflating with gas supplied at least upon a rollover of the vehicle, such that the second deployment portion is located in an area that does not overlap, as viewed laterally, an area in which the first deployment portion is located; and an internal pressure difference creator that makes an internal pressure of the second deployment portion higher than an internal pressure of the first deployment portion at least upon a rollover of the vehicle.

20 Claims, 12 Drawing Sheets

CURTAIN AIRBAG APPARATUS

CROSS REFERENCE TO RELATED APPLICATIONS

This application claims priority to Japanese Patent Application No. 2011-024309 filed on Feb. 7, 2011, which is incorporated herein by reference in its entirety including the specification, drawings and abstract.

BACKGROUND OF THE INVENTION

1. Field of the Invention

The invention relates to curtain airbag apparatuses.

2. Description of Related Art

A curtain airbag is known which has a secondary deployment portion that is adapted to deploy to an area other than those corresponding to where a passenger is seated and that deploys downward beyond the beltline (for example, refer to Japanese Patent Application Publication No. 2007-161167). Further, a curtain airbag is known which is provided with an inflator for feeding gas to an upper deployment portion upon a side collision and an inflator for feeding gas to a lower deployment portion upon a rollover (for example, refer to Japanese Patent No. 4019896).

According to the former curtain airbag, however, the secondary deployment portion needs to be made large in size, that is, in capacity, in order to ensure a sufficient protection performance upon a rollover. According to the latter curtain airbag, too, the capacity of the entire airbag needs to be made large if the head protection range for rollovers is required to be wide in the longitudinal direction of the vehicle.

SUMMARY OF THE INVENTION

The invention provides curtain airbag apparatuses that are capable of effectively protecting a passenger upon a rollover, as well as effectively protecting the head of the passenger upon a side collision, and that reduce the required entire capacity of the curtain airbag.

The first aspect of the invention relates to a curtain airbag apparatus having: a curtain airbag that is embedded, in a folded or rolled state, in an upper edge portion of at least one door opening of a vehicle body and deploys into a form of a curtain, the curtain airbag having a first deployment portion that deploys toward a lower side of a vehicle from the upper edge portion of the vehicle by inflating with gas supplied upon a side collision of the vehicle and upon a rollover of the vehicle, and a second deployment portion that deploys toward the lower side of the vehicle from the upper edge portion of the door opening by inflating with gas supplied at least upon a rollover of the vehicle, such that the second deployment portion is located in an area that does not overlap, as viewed laterally, an area in which the first deployment portion is located; a gas generator that generates the gas to be fed to the first deployment portion and the second deployment portion; and an internal pressure difference creator that makes an internal pressure of the second deployment portion higher than an internal pressure of the first deployment portion at least upon a rollover of the vehicle.

According to the curtain airbag apparatus of the first aspect of the invention, upon a side collision of the vehicle, the first deployment portion deploys by inflating with gas supplied, and thereby protects the head of a passenger from the side collision impacts. On the other hand, upon a rollover of the vehicle, the first and second deployment portions deploy to suppress the movement of the passenger's head toward the laterally outer side of the vehicle over a longitudinally wide range.

According to the structure described above, at least when the passenger is to be protected against a rollover, the internal pressure difference creator makes the internal pressure of the second deployment portion higher than that of the first deployment portion. Therefore, the second deployment portion, despite the fact that its capacity is relatively small, can more effectively suppress the movement of the passenger's head toward the laterally outer side of the vehicle than a deployment portion of which the internal pressure is low (as low as the internal pressure of the first deployment portion). On the other hand, since the internal pressure of the first deployment portion is relatively low, the first deployment portion can effectively protect the head of the passenger while suppressing the load acting on the same head during a side collision of the vehicle.

As such, the curtain airbag apparatus of the first aspect of the invention is capable of effectively protecting the passenger upon a rollover of the vehicle, as well as effectively protecting the head of the passenger upon a side collision of the vehicle, and further it reduces the required entire capacity of the curtain airbag.

The curtain airbag apparatus of the first aspect of the invention may be such that the internal pressure difference creator is provided with a first gas feed portion via which the gas generator feeds the gas to the first deployment portion and a second gas feed portion via which the gas generator feeds the gas to the second deployment portion and at which a gas flow resistance is lower than a gas flow resistance at the first gas feed portion.

According to the curtain airbag apparatus structured as described above, since the gas flow resistance at the second gas feed portion is lower than that at the first gas feed portion, the gas supplied from the gas generator is preferentially fed to the second deployment portion, so that the second deployment portion deploys up to an internal pressure higher than that up to which the first deployment portion deploys.

Further, the curtain airbag apparatus of the first aspect of the invention may be such that: the gas generator is provided with a first gas generation portion that generates the gas to be fed to the first deployment portion and a second gas generation portion that generates the gas to be fed to the second deployment portion, and the internal pressure difference creator is provided with a first gas feed portion via which the gas is, upon a side collision of the vehicle and upon a rollover of the vehicle, fed to the first deployment portion from the first gas generation portion and a second gas feed portion via which the gas, upon a rollover of the vehicle, is fed to the second deployment portion from the second gas generation portion such that the internal pressure of the second deployment portion becomes higher than the internal pressure of the first deployment portion.

According to the curtain airbag apparatus structured as described above, upon a side collision of the vehicle and upon a rollover of the vehicle, the first deployment portion deploys by being supplied with gas from the first gas feed portion. On the other hand, upon a rollover of the vehicle, the second deployment portion deploys by being supplied with gas from the second gas feed portion, such that the second deployment portion deploys up to an internal pressure higher than that up to which the first deployment portion deploys. Because the gas supply source for the first deployment portion and that for the second deployment portion are different, the internal pressure of the second deployment portion can be easily made higher than that of the first deployment portion. It is to be noted that a one-way valve that inhibits a discharge of gas from the second deployment portion may be provided in a gas feed passage to the second deployment portion.

The second aspect of the invention relates to a curtain airbag apparatus having: a curtain airbag that is embedded, in a folded or rolled state, in an upper edge portion of at least one door opening of a vehicle body and deploys into a form of a curtain, the curtain airbag having a first deployment portion that deploys toward a lower side of a vehicle from the upper edge portion of the vehicle by inflating with gas supplied upon a side collision of the vehicle and upon a rollover of the vehicle, and a second deployment portion that deploys toward the lower side of the vehicle from the upper edge portion of the door opening by inflating with gas supplied at least upon a rollover of the vehicle, such that the second deployment portion is located in an area that does not overlap, as viewed laterally, an area in which the first deployment portion is located; a gas generator that generates gas upon a side collision of the vehicle and upon a rollover of the vehicle; and a first gas feed passage via which the gas generator feeds the gas to the first deployment portion; and a second gas feed passage via which the gas generator feeds the gas to the second deployment portion and which is larger in cross-sectional passage area than the first gas feed passage.

According to the curtain airbag apparatus of the second aspect of the invention, upon a side collision of the vehicle and upon a rollover of the vehicle, the gas generator generates gas, and it is fed to the first deployment portion via the first gas feed passage and to the second deployment portion via the second gas feed passage. As such, upon a side collision of the vehicle, the first deployment portion protects the head of the passenger, and upon a rollover of the vehicle, the first and second deployment portions deploy to suppress the movement of the passenger's head toward the laterally outer side of the vehicle over a longitudinally wide range.

According to the structure described above, further, since the cross-sectional passage area of the second gas feed passage is larger than that of the first gas feed passage, the gas supplied from the gas generator is preferentially fed to the second deployment portion, so that the second deployment portion deploys up to an internal pressure higher than that up to which the first deployment portion deploys. Thus, the second deployment portion, despite the fact that its capacity is relatively small, can more effectively suppress the movement of the passenger's head toward the laterally outer side of the vehicle than a deployment portion of which the internal pressure is low (as low as the internal pressure of the first deployment portion). On the other hand, since the internal pressure of the first deployment portion is relatively low, the first deployment portion can effectively protect the head of the passenger while suppressing the load acting on the same head during a side collision of the vehicle.

As such, the curtain airbag apparatus of the second aspect of the invention is capable of effectively protecting the passenger upon a rollover of the vehicle, as well as effectively protecting the head of the passenger upon a side collision of the vehicle, and further it reduces the required entire capacity of the curtain airbag.

The third aspect of the invention relates to a curtain airbag that is embedded, in a folded or rolled state, in an upper edge portion of at least one door opening of a vehicle body and deploys into a form of a curtain, the curtain airbag having a first deployment portion that deploys toward a lower side of a vehicle from the upper edge portion of the vehicle by inflating with gas supplied upon a side collision of the vehicle and upon a rollover of the vehicle, and a second deployment portion that deploys toward the lower side of the vehicle from the upper edge portion of the door opening by inflating with gas supplied at least upon a rollover of the vehicle, such that the second deployment portion is located in an area that does not overlap, as viewed laterally, an area in which the first deployment portion is located; a first gas generation portion that generates, upon a side collision of the vehicle and upon a rollover of the vehicle, the gas to be fed to the first deployment portion; and a second gas generation portion that generates, upon a rollover of the vehicle, the gas to be fed to the second deployment portion such that an internal pressure of the second deployment portion becomes higher than an internal pressure of the first deployment portion.

According to the curtain airbag apparatus of the third aspect of the invention, upon a side collision of the vehicle, the first gas generation portion generates gas and it is fed to the first deployment portion. Thus, upon a side collision of the vehicle, the first deployment portion protects the head of the passenger. On the other hand, upon a rollover of the vehicle, the first gas generation portion generates gas and it is fed to the first deployment portion while the second gas generation portion generates gas and it is fed to the second deployment portion. At this time, the second deployment portion deploys up to an internal pressure higher than that up to which the first deployment portion deploys. As such, upon a rollover of the vehicle, the first and second deployment portions suppress the movement of the passenger's head toward the laterally outer side of the vehicle over a longitudinally wide range.

According to the structure described above, further, since the second deployment portion deploys up to an internal pressure higher than that up to which the first deployment portion deploys, the second deployment portion, despite the fact that its capacity is relatively small, can more effectively suppress the movement of the passenger's head toward the laterally outer side of the vehicle than a deployment portion of which the internal pressure is low (as low as the internal pressure of the first deployment portion). On the other hand, since the internal pressure of the first deployment portion is relatively low, the first deployment portion can effectively protect the head of the passenger while suppressing the load acting on the same head during a side collision of the vehicle.

As such, the curtain airbag apparatus of the third aspect of the invention is capable of effectively protecting the passenger upon a rollover of the vehicle, as well as effectively protecting the head of the passenger upon a side collision of the vehicle, and further it reduces the required entire capacity of the curtain airbag. According to the curtain airbag apparatus of the third aspect of the invention, further, because the gas supply source for the first deployment portion and that for the second deployment portion are different, the internal pressure of the second deployment portion can be easily made higher than that of the first deployment portion. It is to be noted that a one-way valve that inhibits a discharge of gas from the second deployment portion may be provided in the gas feed passage to the second deployment portion.

The curtain airbag apparatus of the third aspect of the invention may be such that upon a side collision of the vehicle, the second gas generation portion is activated a predetermined time after the first gas generation portion is activated.

According to the curtain airbag apparatus structured as described above, upon a side collision of the vehicle, the first gas generation portion generations gas, and it is fed to the first deployment portion. As such, upon a side collision of the vehicle, the first deployment portion protects the head of the passenger. Then, the second gas generation portion is activated the predetermined time after the activation (operation start) of the first gas generation portion, so that the second deployment portion deploys. Thus, in a case where the vehicle rolls over after collided sideways, the first and second deployment portions suppress the movement of the passenger's head toward the laterally outer side of the vehicle over a longitudinally wide range.

The curtain airbag apparatuses of the first to third aspects of the invention may be such that the first deployment portion deploys to an area on an outer side, in a lateral direction of the vehicle, of a head of a passenger, and the second deployment portion deploys to an area in front of the first deployment portion such that a lower end portion of the second deployment portion overlaps a side door of the vehicle, as viewed laterally.

According to the curtain airbag apparatuses structured as described above, the second deployment portion deploys to the area in front of the first deployment portion such that the lower end portion of the second deployment portion overlaps the side door of the vehicle, as viewed laterally. Thus, upon a rollover of the vehicle, the second deployment portion of which the internal pressure is relatively high more effectively suppresses the movement of the passenger's head toward the laterally outer side of the vehicle, with the lower end portion of the second deployment portion being caught by (being in contact with) the side door.

Further, the first deployment portion may deploy to an area on the outer side, in the lateral direction of the vehicle, of a head of a passenger on a front seat of the vehicle, and the second deployment portion may deploy to an area in front of the first deployment portion such that an upper end portion of the second deployment portion overlaps a front pillar of the vehicle, as viewed laterally.

According to the curtain airbag apparatuses structured as described above, the second deployment portion deploys such that the upper end portion of the second deployment portion overlaps the front pillar and the lower end portion of the second deployment portion overlaps the side door, as viewed laterally. As such, at least in the initial stage of the rollover, the movement of the passenger's head toward the laterally outer side of the vehicle can be more effectively suppressed, enhancing the passenger head protection performance for the front side of the front seat.

The curtain airbag apparatus of the second aspect of the invention may be such that the gas feed passage to the second deployment portion has a one-way valve that allows gas to be fed to the second deployment portion via the same gas feed passage, and that inhibits a discharge of gas from the second deployment portion via the same gas feed passage.

According to the curtain airbag apparatus structured as described above, since the one-way valve is provided at the gas feed passage to the second deployment portion, the discharge of gas from the second deployment portion is inhibited, and therefore the internal pressure of the second deployment portion is kept high for a long period of time. As such, the movement of the passenger's head toward the laterally outer side of the vehicle can be more effectively suppressed during a rollover for which the second deployment portion is required to be kept in its deployed (inflated) state for a relatively long period of time.

Further, the second gas feed passage may be folded or rolled together with the first deployment portion and the second deployment portion and include a tubular piece via which the gas generator feeds the gas to the second deployment portion, and the one-way valve may be formed by a downstream end portion of the tubular piece being put into the second deployment portion.

According to the curtain airbag apparatus structured as described above, the gas is fed to the second deployment portion via the tubular piece. The portion, put in the second deployment portion, of the tubular piece is placed in its closed state by being pressed against the inner face of the second deployment portion when the internal pressure of the second deployment portion becomes higher than the internal pressure at the upstream side of the gas flow path. This structure is therefore simpler than a structure in which a one-way valve independent of the tubular piece is provided.

The curtain airbag apparatuses of the first to third aspects of the invention may be such that the first deployment portion deploys to an area on an outer side, in a lateral direction of the vehicle, of a head of a passenger, and a rear deployment portion that deploys so as to overlap a middle pillar of the vehicle, as viewed laterally, is provided at or on a rear side of the first deployment portion.

According to the curtain airbag apparatuses structured as described above, since the rear deployment portion at the first deployment portion deploys so as to overlap the middle pillar, the first deployment portion can more effectively suppress the movement of the passenger's head toward the laterally outer side of the vehicle during a rollover. That is, the passenger protection performance of the first deployment portion for rollovers can be enhanced without increasing the internal pressure of the first deployment portion.

The curtain airbag apparatuses of the first to third aspects of the invention may be such that the first deployment portion deploys to an area on an outer side, in a lateral direction of the vehicle, of a head of a passenger, and a delayed-deployment portion is provided which deploys, with a time lag from the first deployment portion, to an area below the first deployment portion by being supplied with gas from the first deployment portion via a narrowed passage, such that the delayed-deployment portion overlaps, as viewed laterally, a side door of the vehicle and an upper portion of a side airbag.

According to the curtain airbag apparatuses structured as described above, upon a side collision of the vehicle, the side airbag deploys to protect the passenger, and thereafter the delayed-deployment portion deploys so as to overlap the upper portion of the side airbag, as viewed laterally. Since the delayed-deployment portion deploys so as to overlap the side door, the first deployment portion connected to the delayed-deployment portion can more effectively suppress the movement of the passenger's head toward the laterally outer side of the vehicle during a rollover of the vehicle. That is, the passenger protection performance of the first deployment portion for rollovers can be enhanced without increasing the internal pressure of the first deployment portion.

Accordingly, the curtain airbag apparatuses of the foregoing aspects of the invention are capable of effectively protecting the passenger upon a rollover of the vehicle, as well as effectively protecting the head of the passenger upon a side collision of the vehicle, and they further reduce the required entire capacity of the curtain airbag, and such features are highly desirable.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

A vehicle airbag system 10 of the first example embodiment of the invention will be described with reference to FIGS. 1 to 7. In the following, the outline of the overall structure of the vehicle airbag system 10 will be first described, and then the structure of a curtain airbag 12, which is the main structural element of the vehicle airbag system 10 of the first example embodiment, and the structure for feeding gas to the curtain airbag 12 will be described in this order. It is to be noted that the arrows FR, UP, IN, and OUT in each drawing indicate, respectively, the forward direction (forward traveling direction), the upper side, the laterally inner inside side, and the laterally outer side of a motor vehicle S incorporating the vehicle airbag system 10. In the following descriptions, unless otherwise specified, the phrases using "front", "rear", "upper", and "lower" (and the terms similar to them) shall be interpreted as indicating the front side, rear side, upper side, and lower side of the vehicle, respectively, and the phrases using "laterally outer" and "laterally inner" (and the terms similar to them) shall be interrupted as indicating the laterally outer side and laterally inner side of the vehicle, respectively.

Figure 1:
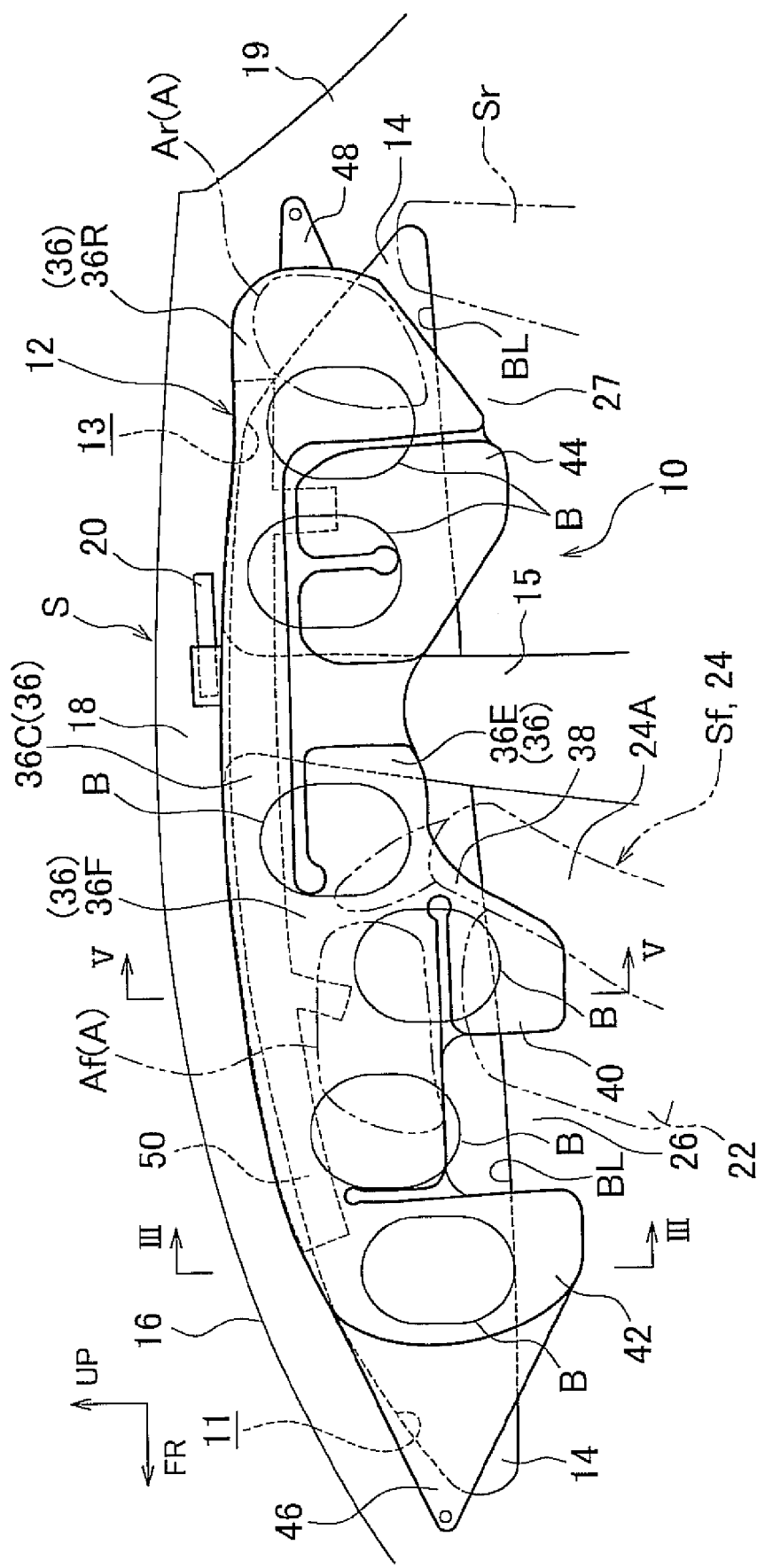
FIG. 1 is a side view illustrating the outline of the overall structure of a curtain airbag apparatus of the first example embodiment of the invention, as seen from the passenger compartment of the vehicle.

FIG. 1 is a side view as seen from the passenger compartment of the motor vehicle S incorporating the vehicle airbag system 10. As shown in FIG. 1, the vehicle airbag system 10 is provided with the curtain airbag 12 and a side airbag 22.

The curtain airbag 12 is formed to deploy along the inner sides of side windows 14 and the inner side of a center pillar (B pillar) 15. In the first example embodiment, the curtain airbag 12 is formed to cover, when deployed, the inner side of the front side window 14 beside a front seat Sf and the inner side of the rear side window 14 beside a rear seat Sr.

Although not shown in the drawings, the curtain airbag 12 is vertically rolled or folded like bellows, and is embedded in the space extending from a front pillar (A pillar) 16 to a position near a rear pillar 19 via a roof-side portion 18. In the state described later, the curtain airbag 12 deploys along the front side window 14, the center pillar 15, and the rear side window 14 to protect the heads of the respective passengers on the front and rear seats, as shown in FIG. 1. It is to be noted that the roof-side portion 18 in the first example embodiment serves as the upper edge of a front side door opening 11, which is defined by the roof-side portion 18, the front pillar 16, and the center pillar 15, and serves also as the upper edge of a rear door opening 13, which is defined by the roof-side portion 18, the center pillar 15, and the rear pillar 19. With regard to the position of the curtain airbag 12, more specifically, it is arranged between a roof side rail and a roof head lining constituting the roof-side portion 18. It is to be noted that FIGS. 3 and 4 each show a state where the curtain airbag 12 (a front secondary-chamber 42, which will be described later) is deploying from between the front pillar 16 and a pillar garnish 17.

The vehicle airbag system 10 is further provided with an inflator 20 serving as "gas generator" in the invention, and it generates the gas to be fed into the curtain airbag 12. The inflator 20 may of a combustion type or a cold-gas type. When activated, the inflator 20 feeds a large amount of gas into the curtain airbag 12. The gas discharge holes of the inflator 20 are in communication with some portions or sections in the curtain airbag 12 via an inner tube 50, which will be described later. In the first example embodiment, the inflator 20 is arranged at the roof-side portion 18. The deployed form of the curtain airbag 12 and the gas feed structure for feeding gas to the curtain airbag 12 from the inflator 20 will be described later.

The side airbag 22 deploys into the space between a vehicle seat 24, which is the front seat Sf on which a passenger is seated, and a front side door 26 to protect the upper part (the lumbar and chest parts (areas)) of the body of the passenger seated on the vehicle seat 24. In the first example embodiment, the upper edge of the side airbag 22, when deployed, is located slightly higher than a beltline BL extending along the lower edges of the side windows 14 of the motor vehicle S. It is to be noted that the side airbag 22 may be adapted to protect also the shoulder part (area) of the passenger.

Although not shown in the drawings, the side airbag 22 is, for example, rolled or folded like bellows, and is vertically embedded in the laterally outer side portion of a seatback 24A of the vehicle seat 24, and when supplied with the gas from an inflator 28 (refer to FIG. 6), the side airbag 22 inflates and thus deploys. The inflator 28 may be, for example, a combustion type inflator that generates gas by combusting a gas generation agent (or material), or a cold-gas type inflator. The inflator 28 is embedded in the seatback 24A of the vehicle seat 24 together with the side airbag 22.

As such, the side airbag 22 is formed to deploy to cover the space between the passenger seated on the vehicle seat 24 and the front side door 26, regardless of in which of the front end position, rear end position, and any position therebetween the vehicle seat 24 is set. It is to be noted that the vehicle seat 24 is set in the front end position in the example case illustrated in FIG. 1.

Figure 6:
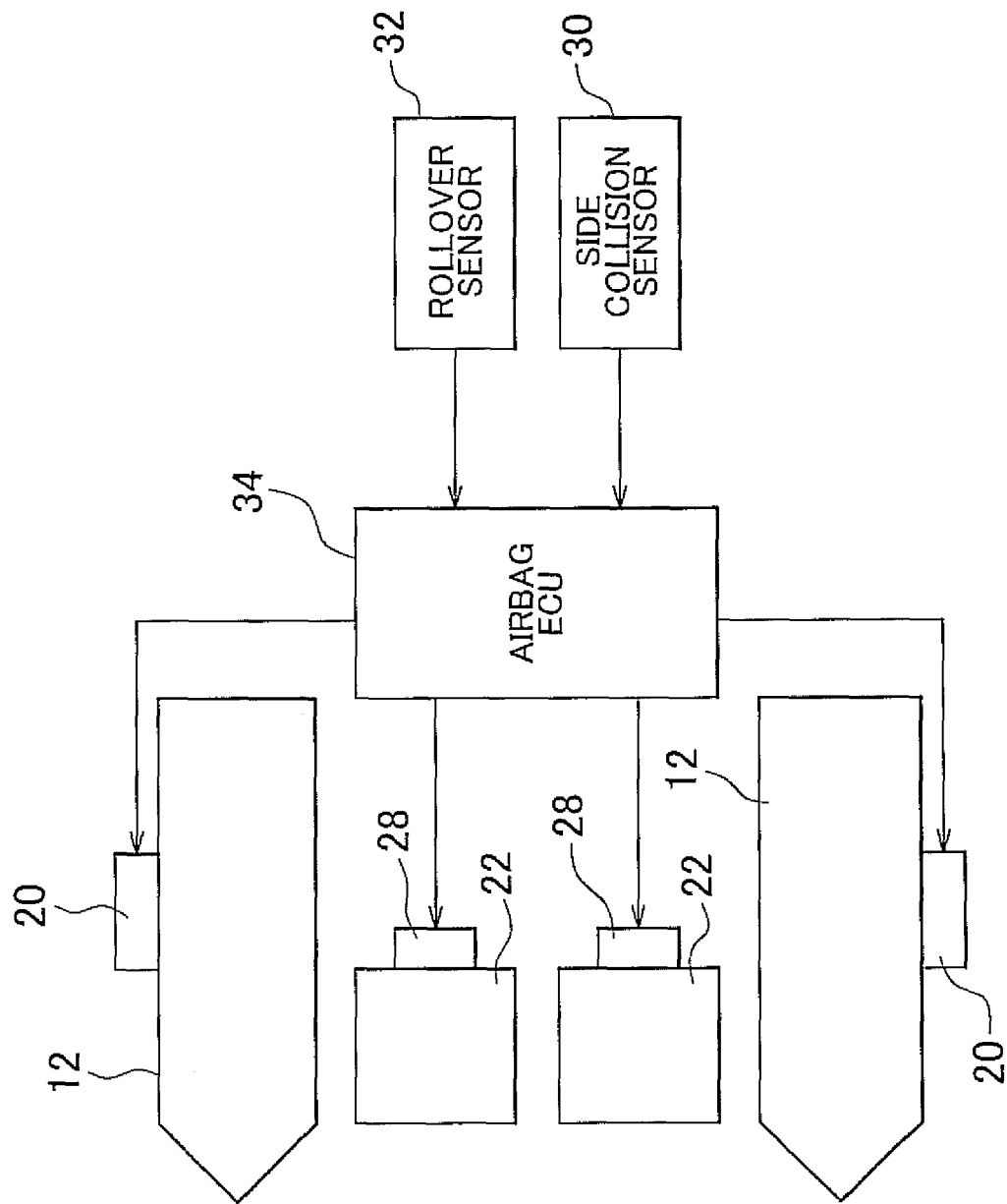
FIG. 6 is a block diagram schematically illustrating the control system of a vehicle airbag system of the first example embodiment of the invention.

The curtain airbag 12 and the inflator 20, each described above, are provided in pairs at the right and left sides, as schematically shown in FIG. 6. Further, the side airbag 22 and the inflator 28 are provided at each of the right and left front seats 24 (i.e., the driver's seat and the navigator's seat).

Referring to FIG. 6, the vehicle airbag system 10 is further provided with a side collision sensor 30, a rollover sensor 32, and an airbag ECU (Electronic Control Unit) 34 electrically connected to them and serving as a controller. The side collision sensor 30 detects or predicts a side collision of the motor vehicle S (i.e., the unavoidableness of the same side collision) and then outputs a side collision detection signal to the airbag ECU 34. The rollover sensor 32 detects or predicts a rollover of the motor vehicle S (i.e., the unavoidableness of the same rollover) and then outputs a rollover detection signal to the airbag ECU 34.

When receiving the side collision detection signal, the airbag ECU 34 activates the inflators 20 and 28 at the side where the detected side collision occurs (will hereinafter be referred as "the near side"). Thus, upon a side collision of the motor vehicle S, gases are fed to the curtain airbag 12 and the side airbag 22 provided at the near side, so that they are inflated to deploy into given forms. Further, when receiving the rollover detection signal, the airbag ECU 34 activates the inflators 20 at the respective lateral sides of the motor vehicle S. In a case where the airbag ECU 34 receives the rollover detection signal after a side collision, the airbag ECU 34 activates the inflator 20 at the lateral side opposite to the near side where the inflator 20 has already been activated. The side opposite to the near side will hereinafter be referred to as "the far side". Further, in the first example embodiment, the airbag ECU 34 is adapted not to activate the inflators 28 when receiving the rollover detection signal only.

Hereinafter, the structure of the curtain airbag 12 will be described in detail. It is to be noted that the following descriptions on the structure and form of the curtain airbag 12 assume that the curtain airbag 12 is in its inflated (deployed) state, unless otherwise specified. Referring to FIG. 1, the curtain airbag 12 has primary chambers 36 (an example of "first deployment portion"), a delay chamber 40 (an example of "delayed-deployment portion") that communicates with the primary chambers 36 via a narrowed passage 38, a front secondary chamber 42 (an example of "second deployment portion"), and a rear secondary chamber 44 (another example of "second deployment portion").

When inflated, the primary chambers 36 each deploy to cover an area including a side-collision head protection area (refer to the areas A shown in FIG. 1). More specifically, the primary chambers 36 include a front primary chamber 36F that deploys, when inflated, to cover an area including a side-collision head protection area Af for the front seat Sf, a rear primary chamber 36R that deploys, when inflated, to cover an area including a side-collision head protection area Ar for the rear seat Sr, and a communication portion 36C that extends along the roof-side portion 18 and interconnects the front primary chamber 36F and the rear primary chamber 36R. A tube body 50A of the inner tube 50, which will be described later, is provided in the communication portion 36C.

An extension chamber 36E (an example of "rear deployment portion") is provided which inflates and thus deploys to an area behind the front primary chamber 36F and below the communication portion 36C. The front end of the extension chamber 36E is connected to the front primary chamber 36F, and is supplied with gas from the front primary chamber 36F. The rear side of the extension chamber 36E overlaps, as viewed laterally, the center pillar 15 (an example of "middle pillar").

The narrowed passage 38 extends generally downward from the front-lower side of the extension chamber 36E and leads to the rear side of the delay chamber 40. Supplied with gas via the narrowed passage 38, the delay chamber 40 inflates and thus deploys below the front primary chamber 36F.

Referring to FIG. 1, the upper edge of the delay chamber 40 is joined (connected) with the lower edge of the front primary chamber 36F, and the lower edge of the delay chamber 40 is located lower than the beltline BL. Thus, the deployment area of the lower portion of the delay chamber 40 overlaps the deployment area of the side airbag 22, as viewed laterally. According to the vehicle airbag system 10, therefore, when deploying upon a side collision, the lower portion of the delay chamber 40 overlaps, below the beltline BL, the deployment area of the upper portion of the side airbag 22 that is also deploying.

Figure 5:
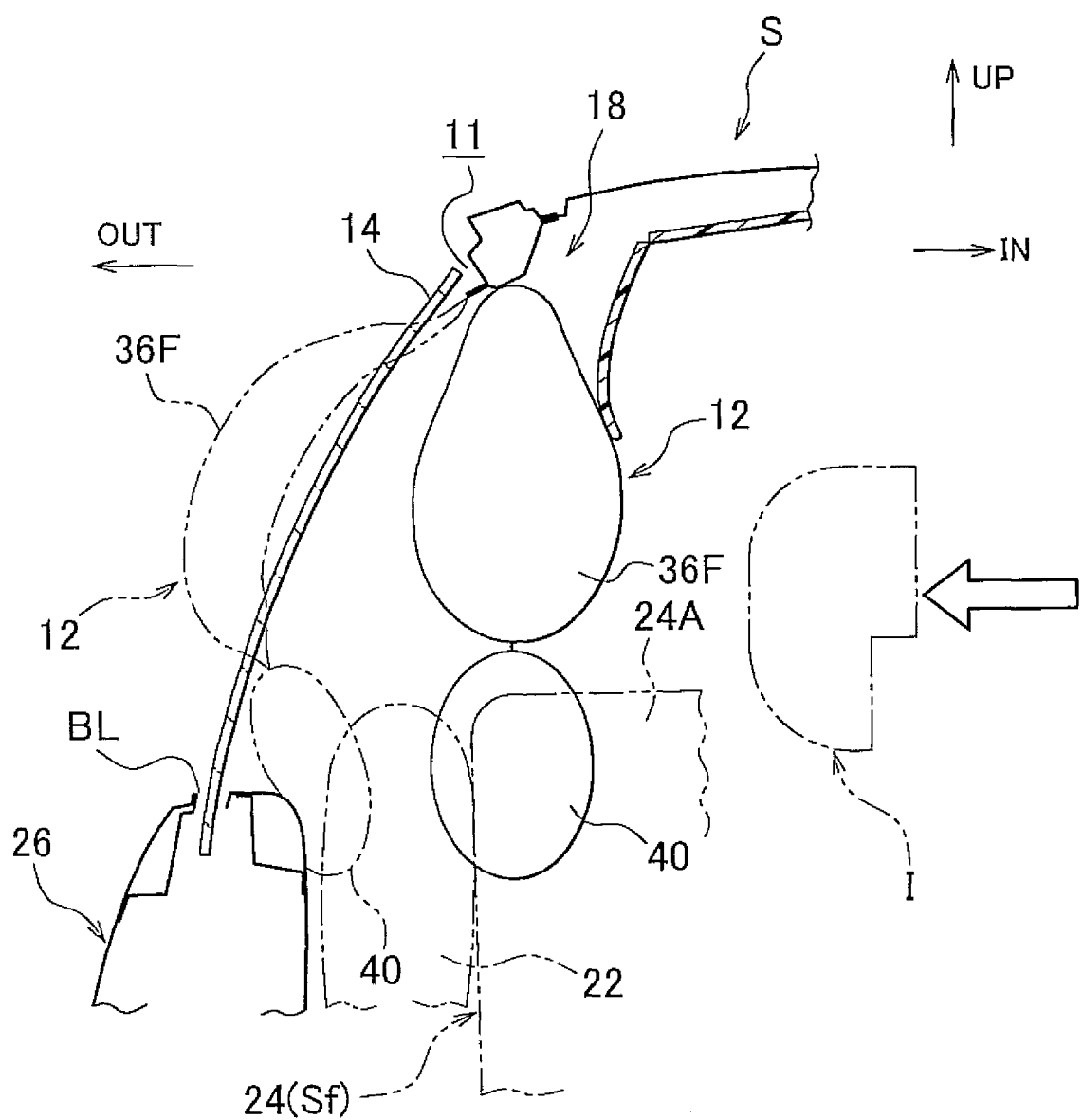
FIG. 5 is an enlarged sectional view showing a delay chamber of the curtain airbag apparatus of the first example embodiment of the invention, which is taken along the line indicated by the arrows V in FIG. 1.

The delay chamber 40 is formed and arranged such that the deployment area of the lower portion of the delay chamber 40 overlaps the deployment area of the upper portion of the side airbag 22, regardless of whether the vehicle seat 24 (the front seat Sf) is set in the front end position or in the rear end position, that is, regardless of the longitudinal position in which the vehicle seat 24 is presently set. Further, referring to FIG. 5, the delay chamber 40, which is used to protect the head of the passenger, is formed and arranged such that the deployment area of the lower portion of the delay chamber 40 overlaps the deployment area of the upper portion of the side airbag 22, as viewed longitudinally as well. It is to be noted that the curtain airbag 12 indicated by broken lines in FIG. 5 is in the process of protecting the head of the passenger.

Upon a rollover, the delay chamber 40 deploys to such an area that the delay chamber 40 protects, near the vehicle seat 24, the head of the passenger in cooperation with the front primary chamber 36F. The area B indicated by a thin line in FIG. 1 corresponds to a test point (impact point) against which an impactor I (refer to FIG. 5), corresponding to a dummy passenger head used in a rollover test according to Federal Motor Vehicle Safety Standard (FMVSS) No. 226, is hit. In order to protect the passenger's head by reducing the amount of movement of the passenger's head toward the outside of the motor vehicle S during a rollover, the delay chamber 40 is formed and arranged to deploy down to a level lower than the beltline BL along the front side door 26 and then comes into contact with the portion, located lower than the beltline BL, of the front side door 26.

The gas flow resistance of the narrowed passage 38 (i.e., the pressure loss at the narrowed passage 38) is higher than the gas flow resistance of the primary chambers 36, which are the main deployment portions of the curtain airbag 12, and therefore the delay chamber 40 inflates (deploys) with a time lag from the inflation (deployment) of the primary chamber 36.

Figure 7:
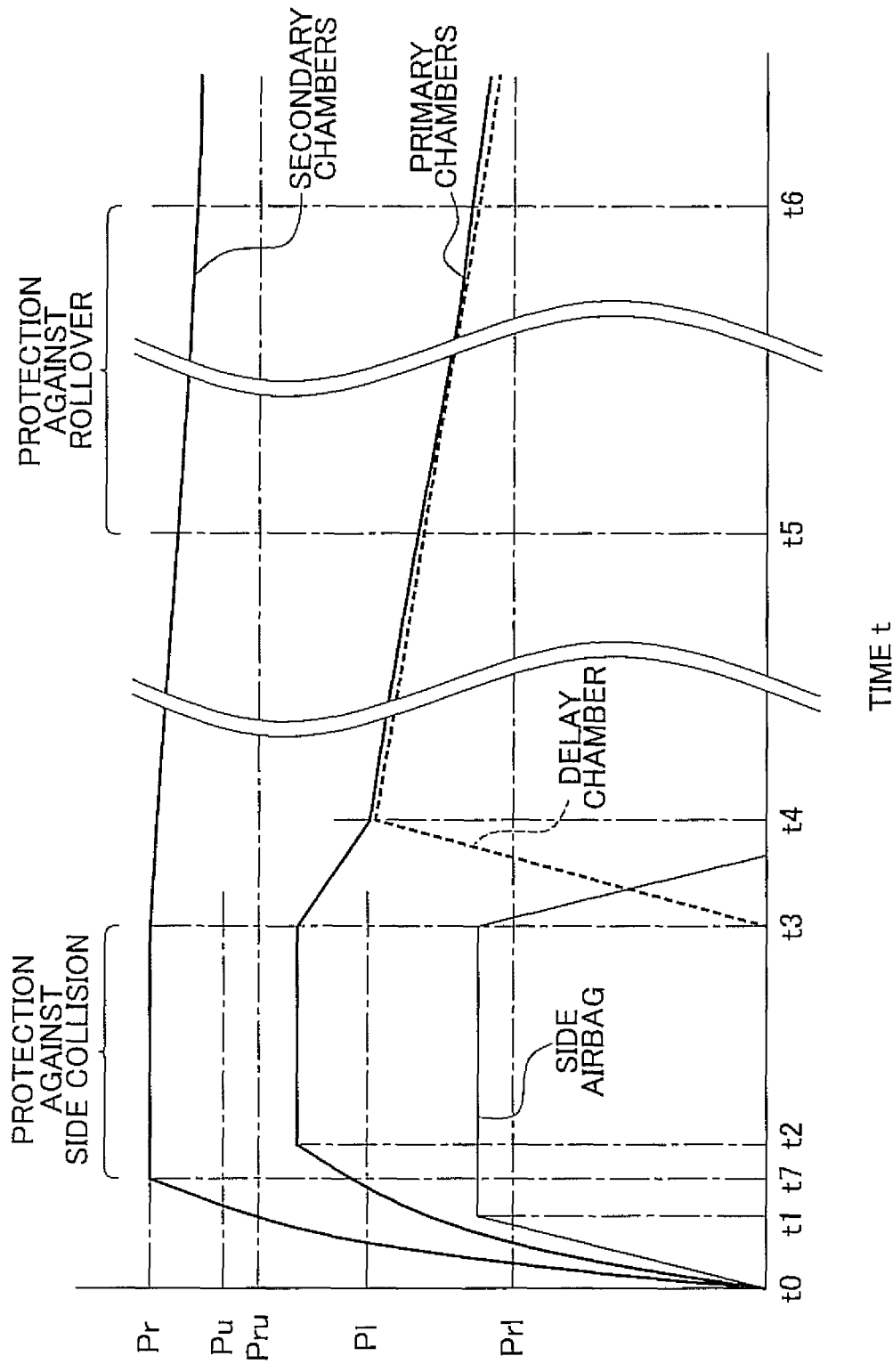
FIG. 7 is a chart illustrating the deployment timings of a side airbag and the curtain airbag of the vehicle airbag system of the first example embodiment of the invention.

In the meantime, referring to FIG. 7, the vehicle airbag system 10 is designed such that the deployment of the side airbag 22 is completed at the time point t1 that is approximately 20 msec after the time point t0 at which a side collision detection signal is input from the side collision sensor 30, that is, at which the inflators 20 and 28 are activated, and the deployments of the respective primary chambers 36 of the curtain airbag 12 are completed at the time point t2 that is approximately 35 msec after the time point t0. It is to be noted that after the time point t3, the internal pressure of the side airbag 22 becomes sufficiently low as a result of the temperature decrease (i.e., volume decrease) caused by the heat exchange between the gas and the air in the passenger compartment and/or due to the gas being discharged via a vent hole(s) (not shown in the drawings).

Meanwhile, upon a side collision, the protection of the upper body of the passenger by the side airbag 22 and the protection of the head of the passenger by the corresponding primary chamber 36 of the curtain airbag 12 are completed until the time point t3 that is approximately 100 msec after the time point t0. The curtain airbag 12 is designed such that the inflation of the delay chamber 40 substantially starts at the time point t3 (the target setting in design). More specifically, in the vehicle airbag system 10, the inner diameter of the narrowed passage 38 is set within the range of 40 to 70 mm (note that it is set to 55 mm in the first example embodiment) so that the inflation of the delay chamber 40 starts after the time point t3. It is to be noted that the time point t4 in the chart of FIG. 7 is the time point at which the deployment of the delay chamber 40 is completed.

According to the vehicle airbag system 10, as such, upon a side collision, the delay chamber 40 starts inflating to deploy after the completion of the passenger protection by the curtain airbag 12 and the side airbag 22. In the meantime, normally, a rollover of the motor vehicle S that is caused by a side collision occurs within the period from approximately 1.5 sec after the time point t0 (the time point t5) to approximately 6 sec after the time point t0 (the time point t6), while a rollover that is caused by other reason occurs within the period from approximately 1.5 sec after the output of the rollover detection signal from the rollover sensor 32 (i.e., the time point t0 at which to activate the inflators 20) to approximately 6 sec after the same output.

The front secondary chamber 42 and the rear secondary chamber 44 are rollover chambers that deploy, upon a rollover, to an area offset forward from the head protection area Af for side collisions and an area offset rearward from the head protection area Ar for side collisions, respectively. That is, the front secondary chamber 42 serves as a front seat rollover chamber for protecting, upon a rollover, the head of the passenger seated on the front seat Sf in front of the front seat Sf, while the rear secondary chamber 44 serves as a rear seat rollover chamber for protecting, upon a rollover, the head of the passenger seated on the rear seat Sr in front of the rear seat Sr.

More specifically, the front secondary chamber 42 is a bag portion that is separate from the front primary chamber 36F and deploys in front of the front primary chamber 36F, thus serving as the front end bag portion of the curtain airbag 12. The front secondary chamber 42 is formed such that, as viewed laterally, the upper edge of the front secondary chamber 42 overlaps the front pillar 16 while the lower edge of the front secondary chamber 42 is located lower than the beltline BL, overlapping the front portion of the front side door 26. In the first example embodiment, the front secondary chamber 42 deploys into a generally columnar (elongated) form of which the axis extends substantially vertically.

The front secondary chamber 42 covers the most forward test point in the rollover test described above. That is, at the most forward test point, the upper edge side of the front secondary chamber 42 contacts and is thus caught by the front pillar 16 while the lower edge side of the front secondary chamber 42 contacts and is thus caught by the front side door 26, thereby suppressing the movement of the passenger's head toward the laterally outer side of the motor vehicle S during a rollover. In the first example embodiment, the upper edge of the front secondary chamber 42 is fixed on the front pillar 16 using a fastener 45. It is to be noted that the most rearward test point for the front seat Sf in the rollover test described above is covered by the front primary chamber 36F and the extension chamber 36E.

The rear secondary chamber 44 deploys in front of the rear primary chamber 36R, serving as the bag portion between the rear primary chamber 36R and the extension chamber 36E. The upper edge of the rear secondary chamber 44 is joined (connected) with the lower edge of the communication portion 36C, while at least a portion of the lower edge of the rear secondary chamber 44 is located lower than the beltline BL, overlapping the rear side door 27. The rear secondary chamber 44 and the communication portion 36C cover the most forward test point for the rear seat Sr in the rollover test described above. At the most forward test point for the rear seat Sr, the communication portion 36C, which is connected with the upper side of the rear secondary chamber 44, contacts and is thus caught by the roof-side portion 18 while the lower edge of the rear secondary chamber 44 contacts and is thus caught by the rear side door 27, thereby suppressing the movement of the passenger's head toward the laterally outer side of the motor vehicle S during a rollover. It is to be noted that the most rearward test point for the rear seat Sr in the rollover test described above is covered by the rear primary chamber 36R and the rear portion of the rear secondary chamber 44.

The front end bag portion of the curtain airbag 12 described above, that is, the front secondary chamber 42 of the curtain airbag 12 is supported by the lower portion of the front pillar 16 via a tension cloth 46 that is generally triangular as viewed laterally. Further, the rear end bag portion of the curtain airbag 12, that is, the rear primary chamber 36R of the curtain airbag 12 is supported by the rear pillar 19 via a tension cloth 48.

Further, among the respective portions of the curtain airbag 12, textile sealing (e.g., silicon coating) is applied to at least of the surface of the base cloth from which the front secondary chamber 42 is made. This is effective to maintain the internal pressure of the inflated bag. In the first example embodiment, silicon coating is applied to the surfaces of the base cloths of the delay chamber 40, the front secondary chamber 42, and the rear secondary chamber 44.

Figure 2:
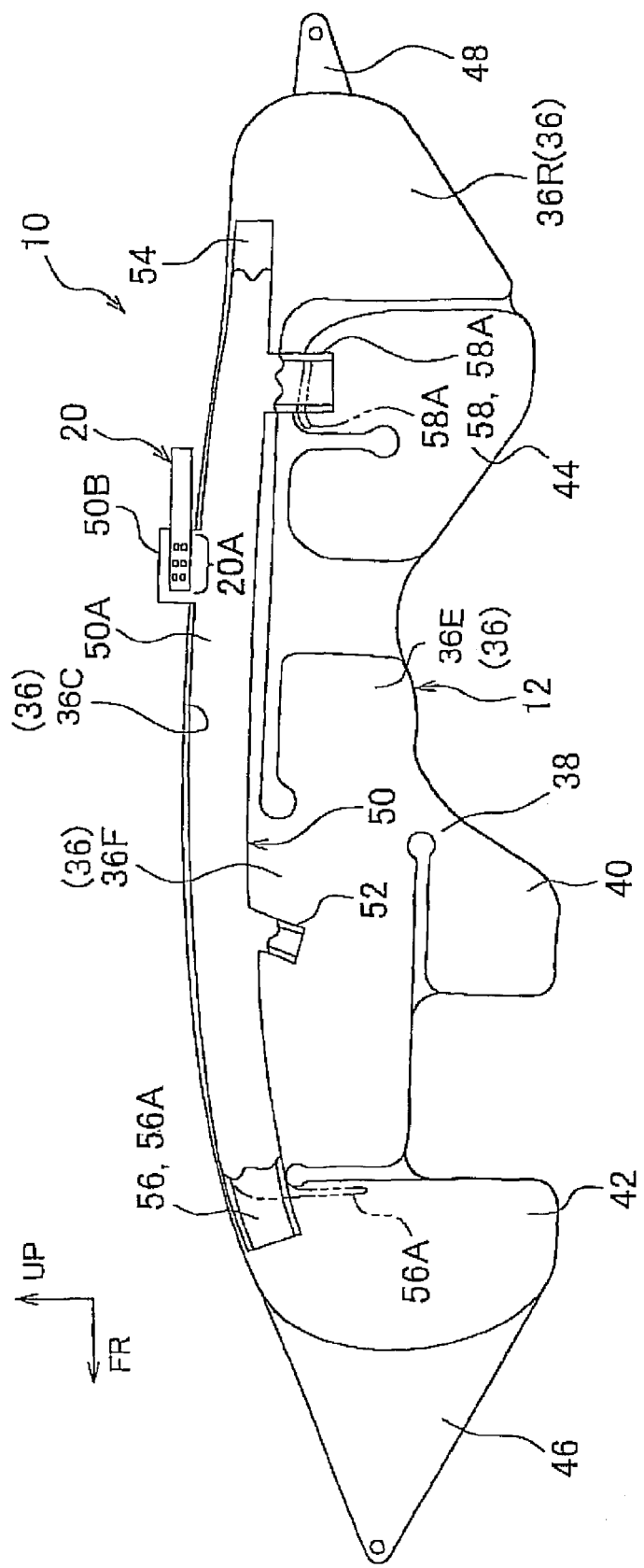
FIG. 2 is a sectional view schematically showing the internal structure of a curtain airbag of the curtain airbag apparatus of the first example embodiment of the invention.
Figure 3:
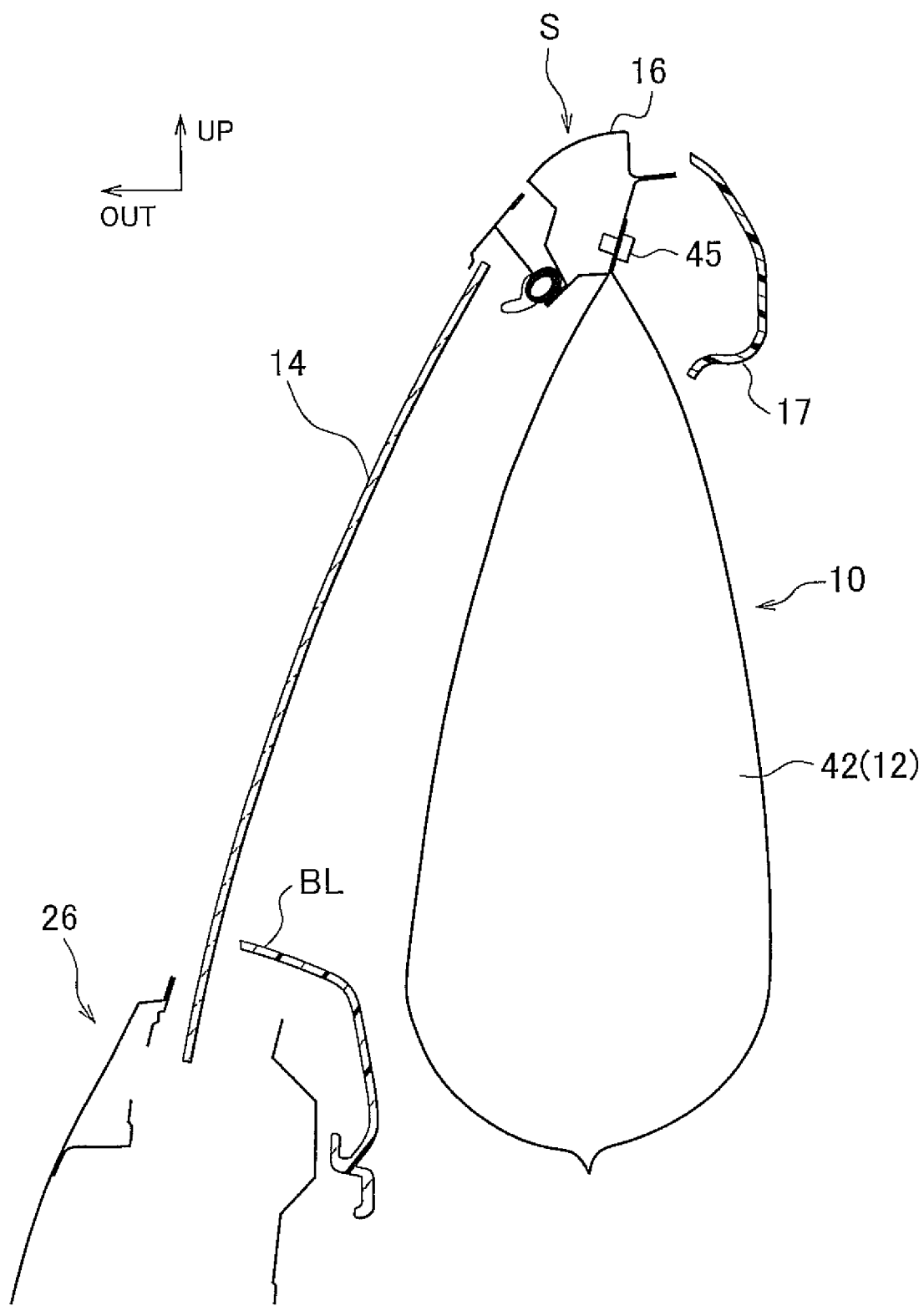
FIG. 3 is an enlarged sectional view showing a front secondary chamber of the curtain airbag apparatus of the first example embodiment of the invention, which is taken along the line indicated by the arrows III in FIG. 1.
Figure 4:
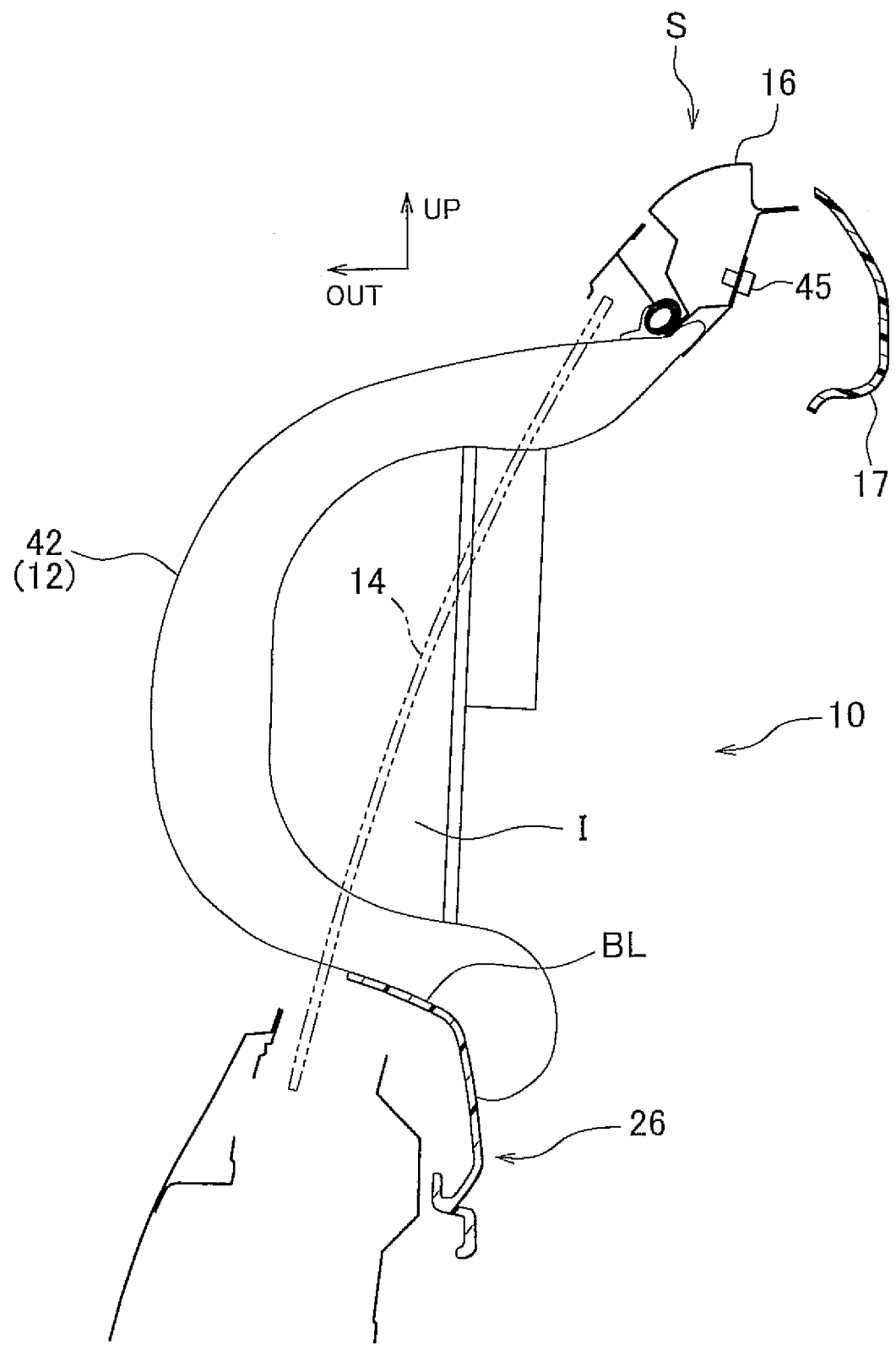
FIG. 4 is a sectional view schematically illustrating a state of the front secondary chamber of the curtain airbag apparatus of the first example embodiment of the invention during a rollover test.

Referring to FIG. 2, the inner tube 50, which is a tubular piece, is provided in the communication portion 36C of the curtain airbag 12. The inner tube 50 is tubular, extending longitudinally along the roof-side portion 18, and its front end is at the rear side of the upper portion of the front secondary chamber 42 and the rear end is at the front side of the upper portion of the rear primary chamber 36R. The inner tube 50 has a gas outlet portion 50B which protrudes from the tube body 50A and in which gas discharge holes 20A of the inflator 20 are provided. Further, the tube body 50A of the inner tube 50 has a front primary gas discharge portion 52 from which to discharge the gas into the front primary chamber 36F, a rear primary gas discharge portion 54 from which to discharge the gas into the rear primary chamber 36R, a front secondary gas discharge portion 56 from which to discharge the gas into the front secondary chamber 42, and a rear secondary gas discharge portion 58 from which to discharge the gas into the rear secondary chamber 44.

The gas outlet portion SOB is arranged near the longitudinal center portion of the inner tube 50 (i.e., arranged above the center pillar 15). The front secondary gas discharge portion 56, the front primary gas discharge portion 52, the rear secondary gas discharge portion 58, and the rear primary gas discharge portion 54 are arranged in this order from the front. The front secondary chamber 42 and the front primary chamber 36F are partitioned off from each other by the inner tube 50 (the front secondary gas discharge portion 56) attached on the inner side of the communication portion 36C by sewing, for example. Likewise, the rear primary chamber 36R and the rear secondary chamber 44 are partitioned off form each other by the inner tube 50 (the rear secondary gas discharge portion 58) attached on the inner side of the communication portion 36C by sewing, for example.

According to the structure described above, in the curtain airbag 12, the gas generated by the inflator 20 is fed (distributed) to the front primary chamber 36F, the rear primary chamber 36R, the front secondary chamber 42, and the rear secondary chamber 44 through the inner tube 50 only. In the following, how the vehicle airbag system 10 is structured to make the internal pressures of the front secondary chamber 42 and the rear secondary chamber 44 higher than those of the primary chambers 36 will be described, more specifically, an example structure serving as "internal pressure difference creator" in the invention will be described.

The front primary gas discharge portion 52 is a tubular portion branching downward from the tube body 50A, and the inner diameter of the front primary gas discharge portion 52 is smaller than that of the tube body 50A. The inner diameter of the rear primary gas discharge portion 54 gradually decreases toward its end from the rear end of the tube body 50A. On the other hand, the inner diameter of the front secondary gas discharge portion 56 is uniform or substantially uniform, that is, it is equal to the inner diameter of the tube body 50A. The rear secondary gas discharge portion 58 is a tubular portion branching downward from the boundary between the tube body 50A and the rear primary gas discharge portion 54. The inner diameter of the rear secondary gas discharge portion 58 is larger than that of the rear primary gas discharge portion 54.

According to the curtain airbag 12, as such, the cross-sectional passage areas of the gas feed passage (i.e., a portion thereof) via which the gas is fed to the front secondary chamber 42 from the inflator 20 and the gas feed passage (i.e., a portion thereof) via which the gas is fed to the rear secondary chamber 44 from the inflator 20 are larger than those of the gas feed passage (i.e., a portion thereof) via which the gas is fed to the front primary chamber 36F from the inflator 20 and the gas feed passage (i.e., a portion thereof) via which the gas is fed to the rear primary chamber 36R from the inflator 20. Thus, the flow resistances at the gas passages via which to feed the gas to the front secondary chamber 42 and the rear secondary chamber 44, respectively, from the inflator 20 are lower than the flow resistances at the gas passages via which to feed the gas to the front primary chamber 36F and the rear primary chamber 36R, respectively, from the inflator 20.

According to the curtain airbag 12, as such, the flowrates at which to feed the gas to the front secondary chamber 42 and the rear secondary chamber 44, respectively, from the inflator 20 (i.e., the gas amounts fed per unit time) are higher than the flowrates at which to feed the gas to the front primary chamber 36F and the rear primary chamber 36R, respectively, from the inflator 20, and therefore, upon deployment of the curtain airbag 12, the front secondary chamber 42 and the rear secondary chamber 44 each inflate (deploy) up to an internal pressure higher than those up to which the primary chambers 36 inflate (deploy). In other words, the inner diameters of the front primary gas discharge portion 52 and the rear primary gas discharge portion 54 and the inner diameters of the front secondary gas discharge portion 56 and the rear secondary gas discharge portion 58 are set, in consideration of the capacities of the front primary chamber 36F, the rear primary chamber 36R, the front secondary chamber 42, and the rear secondary chamber 44, such that the front secondary chamber 42 and the rear secondary chamber 44 each inflate (deploy) up to an internal pressure higher those up to which the primary chambers 36 inflate (deploy).

In the first example embodiment, accordingly, the inner tube 50, the front primary gas discharge portion 52, and the rear primary gas discharge portion 54 together serve as "first gas feed portion" in the invention, and the inner tube 50, the front secondary gas discharge portion 56, the rear secondary gas discharge portion 58 together serve as "second gas feed portion" in the invention.

In the meantime, the internal pressure of each primary chamber 36 is set to an internal pressure suitable for protecting the passenger's head upon a side collision (i.e., an internal pressure between a lower limit internal pressure Pl and an upper limit internal pressure Pu shown in FIG. 7). The lower limit internal pressure Pl is the minimum internal pressure for preventing the passenger's head from hitting the side window 14 (trim) at the moment of protecting the passenger's head during a side collision. On the other hand, the upper limit internal pressure Pu is the maximum internal pressure allowable to prevent the peak load acting on the passenger's head from exceeding a permissible value at the moment of protecting the passenger's head during a side collision.

In the first example embodiment, an internal pressure Pr of the front secondary chamber 42 and the rear secondary chamber 44, which serve as rollover chambers, is not limited by the upper limit internal pressure Pu, that is, it is set higher than the upper limit internal pressure Pu. That is, in the curtain airbag 12, the primary chambers 36 serves as side collision chambers that are differentiated from the rollover chambers (i.e., the front secondary chamber 42 and the rear secondary chamber 44) that deploy up to a high pressure. Further, since the flow resistance against the gas fed to the front secondary gas discharge portion 56 from the inflator 20 and the flow resistance against the gas fed to the rear secondary gas discharge portion 58 from the inflator 20 are lower than the flow resistance against the gas fed to the front primary chamber 36F from the inflator 20 and the flow resistance against the gas fed to the rear primary chamber 36R from the inflator 20 as described above, the deployments of the front secondary gas discharge portion 56 and the rear secondary gas discharge portion 58 are completed at the time point t7 that is earlier than the time point t2 at which the deployments of the respective primary chambers 36 are completed, as shown in FIG. 7.

Further, the curtain airbag 12 has an internal pressure maintaining structure for minimizing a decrease in the internal pressures of the front secondary chamber 42 and the rear secondary chamber 44, which occurs as time passes. More specifically, a one-way valve 56A that allows the gas to flow to the front secondary chamber 42 from the inner tube 50 side but inhibits the gas from flowing back to the inner tube 50 side from the front secondary chamber 42 side is provided at the front secondary gas discharge portion 56. Likewise, a one-way valve 58A that allows the gas to flow to the rear secondary chamber 44 from the inner tube 50 side but inhibits the gas from flowing back to the inner tube 50 from the rear secondary chamber 44 side is provided at the rear secondary gas discharge portion 58.

The one-way valve 56A is formed by putting the front secondary gas discharge portion 56 (i.e., the tubular cloth piece from which the front secondary gas discharge portion 56 is made) into the front secondary chamber 42. More specifically, when the internal pressure at the inner tube 50 side is higher than the internal pressure at the front secondary chamber 42 side, the one-way valve 56A is in a tubular form (i.e., the one-way valve 56A is maintained in the form for serving as the front secondary gas discharge portion 56), thus allowing the gas to flow into the front secondary chamber 42 from the inner tube 50 side. On the other hand, when the internal pressure at the front secondary chamber 42 side is higher than the internal pressure at the inner tube 50 side, the internal pressure in the front secondary chamber 42 presses the one-way valve 56A against the inner face of the front secondary chamber 42 and thereby squashes it on the same inner face, thus inhibiting the gas from flowing back to the inner tube 50 side from the front secondary chamber 42. As well as the one-way valve 56A, the one-way valve 58A is formed by putting the rear secondary gas discharge portion 58 into the rear secondary chamber 44.

As described above, the vehicle airbag system 10 of the first example embodiment is structured such that the front secondary chamber 42 and the rear secondary chamber 44 each deploy up to an internal pressure higher those up to which the primary chambers 36 deploy and the internal pressures of the front secondary chamber 42 and rear secondary chamber 44 are kept high for a long period of time, more specifically, such that the internal pressures of the front secondary chamber 42 and the rear secondary chamber 44 are kept higher than the predetermined internal pressure Pru during the time period from the time point t5 to the time point t6, over which the protections against a rollover are required.

Meanwhile, as mentioned earlier, the front primary chamber 36F and the rear primary chamber 36R also covers the corresponding test points for the rollover test described above, and their internal pressures are kept equal to or higher than a predetermined internal pressure ("Prl" shown in FIG. 7) during the time period from the time point t5 to the time point t6, over which the protections against a rollover are required. That is, the vehicle airbag system 10 is structured such that the internal pressures of the front secondary chamber 42 and the rear secondary chamber 44 corresponding to the test points at each of which reducing the amount of movement of the passenger's head toward the laterally outer side of the motor vehicle S is relatively difficult are higher than the internal pressures of the respective primary chambers 36.

Next, the effects and advantages of the first example embodiment will be described with reference to FIG. 7 that is the timing chart illustrating the deployment (deflation) timings of the side airbag 22, the primary chambers 36, the delay chamber 40, the front secondary chamber 42, and the rear secondary chamber 44. It is to be noted that the timing chart of FIG. 7 only schematically illustrates the deployment timings of the respective chambers and the changes in their internal pressures, that is, it does not illustrate the actual deployment timings and internal pressure changes. Further, it is to be noted that the vertical axis of the timing chart of FIG. 7 does not correspond to that of the internal pressure of the side airbag 22, that is, the timing chart, with regard to the side airbag 22, only indicates its deployment timing.

According to the vehicle airbag system 10 structured as described above, upon a side collision of the motor vehicle S incorporating the vehicle airbag system 10, the airbag ECU 34 receives a side collision detection signal from the side collision sensor 30 and then activates the inflators 20 and 28 at the near side, that is, the lateral side at which the side collision is occurring or is to occur (the time point t0). After this moment, as shown in FIG. 7, the side airbag 22 is inflated by the gas fed from the inflator 28, so that its deployment is completed (the time point t1). Concurrently, the inflator 20 feeds the gas to the curtain airbag 12 (mainly the chambers except the delay chamber 40) to inflate it, so that the deployments of the front secondary chamber 42 and the rear secondary chamber 44 of the curtain airbag 12 are completed (the time paint t7) and the deployments of the respective primary chambers 36 are completed (the time point t2). After the deployments of the front secondary chamber 42 and the rear secondary chamber 44 are completed, the one-way valves 56A and 58A are closed by the internal pressures of the front secondary chamber 42 and the rear secondary chamber 44, respectively.

In this way, the head of the passenger at the near side is protected by the primary chamber 36, and the upper body of the passenger is protected by the side airbag 22. This passenger protection against the side collision is completed until the time point t3. During this protection, since the internal pressures of the respective primary chambers 36 are kept in the range between the lower limit internal pressure Pl and the upper limit internal pressure Pu, the heads of the respective passengers are moderately, and properly, restricted, and thus are effectively protected.

According to the vehicle airbag system 10, further, at the moment of protecting the passengers upon a side collision, the delay chamber 40 of the curtain airbag 12 does not deploy or its deployment is limited, and therefore the delay chamber 40 does not hinder the side airbag 22 from deploying to an appropriate area, allowing the side airbag 22 to protect the upper body of the passenger effectively.

After the passenger protection against the side collision (i.e., mainly against the side collision) is completed, the delay chamber 40 inflates and thus deploys by the gas being fed from the front primary chamber 36F via the narrowed passage 38. At this time, in the curtain airbag 12, the delay chamber 40 deploys up to an internal pressure almost equal to those of the primary chambers 36 (note that the internal pressure of the delay chamber 40 during its deployment is lower than the internal pressures of the respective primary chambers 36) while the internal pressures of the respective primary chambers 36 are kept equal to or higher than the predetermined internal pressure Prl. As mentioned earlier, the internal pressure of the side airbag 22 becomes sufficiently low (the side airbag 22 deflates) after the end of passenger protection against a side collision (after the time point t3), and therefore the side airbag 22 does not hinder the deployment of the delay chamber 40, that is, the delay chamber 40 appropriately deploys while squashing the upper side of the side airbag 22.

On the other hand, the front secondary chamber 42 and the rear secondary chamber 44 deploy up to an internal pressure higher than those up to which the primary chambers 36 deploy, together with (slightly faster than) the primary chambers 36, and the one-way valves 56A and 58A then close. As such, even in a case where the motor vehicle S rolls over after collided sideways (i.e., a rollover occurs as a result of a side collision), the heads of the respective passengers are effectively protected, from the rollover impacts, over a longitudinally wide area by the curtain airbag 12 with the delay chamber 40 inflated (deployed) as well as the primary chambers 36, the front secondary chamber 42, and the rear secondary chamber 44.

More specifically, as indicated by the broken line in FIG. 5, the lower portion of the delay chamber 40 of the curtain airbag 12, which deploys down to a level lower than the beltline BL, comes into contact with the front side door 26, Therefore, if the head of the passenger hits the delay chamber 40, the delay chamber 40 suppresses the movement of the passenger's head toward the laterally outer side of the motor vehicle S (i.e., reduces the amount of the same movement) while being supported by the reactive force from where the delay chamber 40 and the front side door 26 contact each other. According to the curtain airbag 12, further, since the extension chamber 36E communicating with the delay chamber 40 comes into contact with the center pillar 15, the delay chamber 40 is also supported by the extension chamber 36E (i.e., by receiving a reactive force from the extension chamber 36E), and this also contributes to the reduction of the amount of the movement of the passenger's head toward the laterally outer side of the motor vehicle S during a rollover.

According to the vehicle airbag system 10, further, the front secondary chamber 42 deploys up to an internal pressure higher than the internal pressure up to which the primary chambers 36 deploy, so that the upper edge of the front secondary chamber 42 overlaps the front pillar 16 while the lower edge overlaps the front side door 26, as viewed laterally. Thus, if the head of the passenger hits the front secondary chamber 42, the front secondary chamber 42 suppresses the movement of the passenger's head toward the laterally outer side of the motor vehicle S (i.e., reduces the amount of the same movement of the passenger's head) while being supported by the reactive force from where the front secondary chamber 42 contacts the front pillar 16 and that from where the front secondary chamber 42 contacts the front side door 26.

In addition, suppressing the movement of the passenger's head toward the laterally outer side of the motor vehicle S during a rollover is harder in the area into which the front secondary chamber 42 deploys (i.e., an area near the area B corresponding to the most forward test point) than in other protection areas for the passenger on the front seat Sf. That is, suppressing the movement of the passenger's head toward the laterally outer side of the motor vehicle S during a rollover in the area into which the front secondary chamber 42 deploys requires a relatively large reaction force(s) for supporting the airbag(s). For this reason, if the front secondary chamber 42 was adapted to deploy up to an internal pressure that is equal to or substantially equal to the internal pressure up to which the primary chambers 36 deploy, it would be unavoidable to make the front secondary chamber 42 larger in size and capacity (i.e., the front secondary chamber 42 uses a larger amount of gas for deployment).

According to the vehicle airbag system 10, in view of the above, the front secondary chamber 42 deploys up to an internal pressure higher than those up to which the respective primary chambers 36 deploy, as mentioned earlier, and therefore it is possible to produce large reactive forces when the front secondary chamber 42 protects the head of the passenger. In particular, since the front secondary chamber 42 deploys such that the upper edge of the front secondary chamber 42 overlaps the front pillar 16 and the low edge overlaps the front side door 26, as viewed laterally, the upper and lower edges of the front secondary chamber 42 contact and are thus caught by the vehicle body (i.e., the front pillar 16 and the front side door 26), and therefore large reactive forces can be produced. Further, in particular, since the front secondary chamber 42 deploys into a generally columnar form of which the axis extends substantially vertically, large reactive forces can be produced as compared to a case where a chamber that deploys into a form that is thin in the lateral direction of the motor vehicle S is used as the front secondary chamber 42. Structured as described above, the vehicle airbag system 10 is capable of effectively protecting the passenger's head even in the area near the severe test point describe above during a rollover, due to the front secondary chamber 42 despite the fact that the front secondary chamber 42 is relatively small in capacity.

Accordingly, the vehicle airbag system 10 of the first example embodiment is capable of effectively protecting the passengers upon a rollover, as well as effectively protecting the heads of the respective passengers upon a side collision, and further the required entire capacity of each curtain airbag 12 is relatively small. Meanwhile, with respect to the rear seat Sr, when the passenger's head hits the rear secondary chamber 44, the rear secondary chamber 44 effectively protects the passenger's head from the rollover impacts, as in the case of the head protection by the front secondary chamber 42 at the front seat Sf.

Further, the cross-sectional passage areas (inner diameters) of the front secondary gas discharge portion 56 and rear secondary gas discharge portion 58 of the inner tube 50 are larger than the cross-sectional passage areas (inner diameters) of the front primary gas discharge portion 52 and the rear primary gas discharge portion 54 so that the internal pressures of the front secondary chamber 42 and the rear secondary chamber 44 are higher than those of the primary chambers 36. Thus, despite the fact that a single type inflator that generates gas only once is used as the inflator 20 that is common to the respective chambers, the internal pressures of the front secondary chamber 42 and the rear secondary chamber 44 can be made higher than those of the primary chambers 36, and therefore the curtain airbag 12 is simple in structure.

Further, since the one-way valve 56A is provided at the front secondary gas discharge portion 56 while the one-way valve 58A is provided at the rear secondary gas discharge portion 58, the internal pressures of the front secondary chamber 42 and the rear secondary chamber 44 can be easily kept high. Thus, as shown in FIG. 7, the internal pressures of the respective secondary chambers 42 and 44 decrease more slowly in time than those of the primary chambers 36 do, and therefore the internal pressure Pr that needs to be set for the initial deployment stage so as to achieve the predetermined internal pressure Pru required for the proper protections against rollovers can be set low, and this also contributes to reduce the required capacities of the front secondary chamber 42 and the rear secondary chamber 44, thus, the required capacity of the curtain airbag 12 (the inflator 20).

Further, the one-way valve 56A is formed by simply putting the tubular cloth piece from which the front secondary gas discharge portion 56 is made, into the front secondary chamber 42 from its opening side, and the one-way valve 58A is formed by simply putting the tubular cloth piece from which the rear secondary gas discharge portion 58 is made, into the rear secondary chamber 44 from its opening side. Accordingly, the curtain airbag 12 is simpler in structure than when one-way valves independent, respectively, of the front secondary gas discharge portion 56 and the rear secondary gas discharge portion 58 are used.

Further, in the vehicle airbag system 10, as mentioned earlier, the extension chamber 36E that overlaps, when deployed, the center pillar 15 as viewed laterally and the delay chamber 40 that overlaps, when deployed, the front side door 26 as viewed laterally are in communication with the primary chamber 36 (the front primary chamber 36F). Therefore, during a rollover, the primary chambers 36 exert a sufficient passenger head protection performance even at the predetermined internal pressure Prl that is relatively low.

Next, a vehicle airbag system 60 of the second example embodiment of the invention will be described with reference to FIGS. 8 to 11. It is to be noted that structural elements that are the same as or substantially the same as those of the first example embodiment will be denoted by the same reference numerals, and the descriptions and drawing illustrations of them will be omitted as needed.

Figure 8:
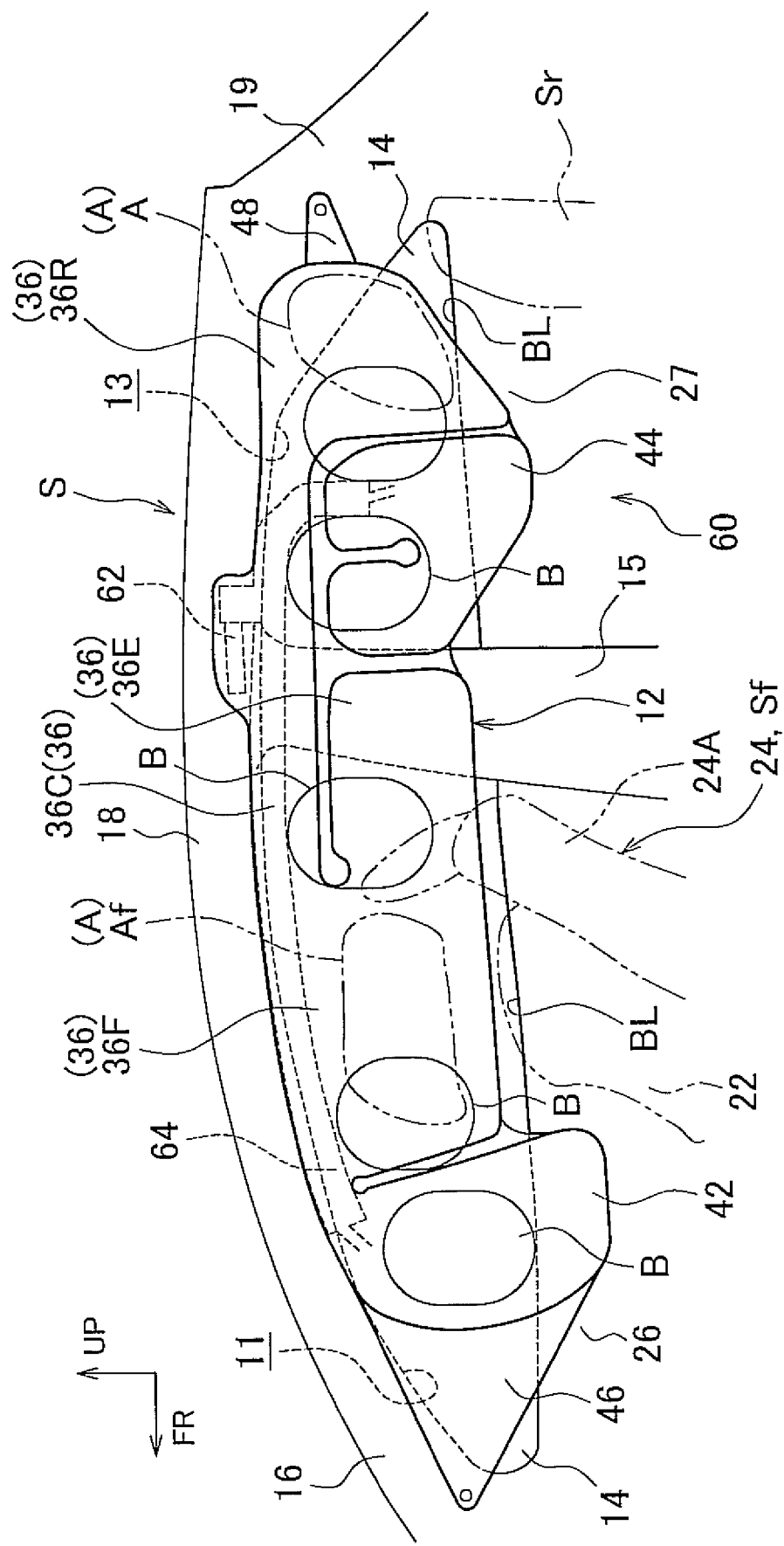
FIG. 8 is a side view schematically showing the outline of the overall structure of a curtain airbag apparatus of the second example embodiment of the invention, as seen from the passenger compartment of the vehicle.

FIG. 8 is a side view schematically showing the outline of the overall structure of the vehicle airbag system 60 in the same way as FIG. 1. Referring to FIG. 8, the vehicle airbag system 60 is different from the vehicle airbag system 10 of the first example embodiment in that the vehicle airbag system 60 has inflators 62 in place of the inflators 20 in the first example embodiment, and inner tubes 64 in place of the inner tubes 50 in the first example embodiment. It is to be noted that although each curtain airbag 12 in the example illustrated in FIG. 8 is not provided with the delay chamber 40, the delay chamber 40 may be provided at each curtain airbag 12. In the following, the structure of the vehicle airbag system 60 will be described in detail.

The inflator 62 is a two-stage-ignition inflator, having a first ignition portion (initiator) 62A and a second ignition portion (initiator) 62C as shown in FIG. 10B. When activated, the first ignition portion 62A is first ignited so that the gas is discharged from first gas discharge holes 62B shown in FIG. 10A, and then the second ignition portion 62C is ignited so that the gas is discharged from second gas discharge holes 62D shown in FIG. 10A as well. The first gas discharge holes 62B of the inflator 62 are located in the communication portion 36C, and the front primary chamber 36F and the rear primary chamber 36R are in communication with the communication portion 36C.

Thus, the gas discharged from the first gas discharge holes 62B of the inflator 62 is fed to the entireties of the primary chambers 36 via the communication portion 36C. As such, in the second example embodiment, the first ignition portion 62A and first gas discharge holes 62B of the inflator 62 and the communication portion 36C (i.e., the structure in which the first gas discharge holes 62B are present in the communication portion 36C) together serve as "first gas feed portion" in the invention. The amount of gas to be fed to the primary chambers 36 is set such that the primary chambers 36 each deploy up to an internal pressure between the lower limit internal pressure Pl and the upper limit internal pressure Pu. It is to be noted that the primary chambers 36 are partitioned off from the front secondary chamber 42 and the rear secondary chamber 44, as will be described later, and therefore the gas discharged from the first gas discharge holes 62B is not fed to the front secondary chamber 42 and the rear secondary chamber 44.

Figure 9:
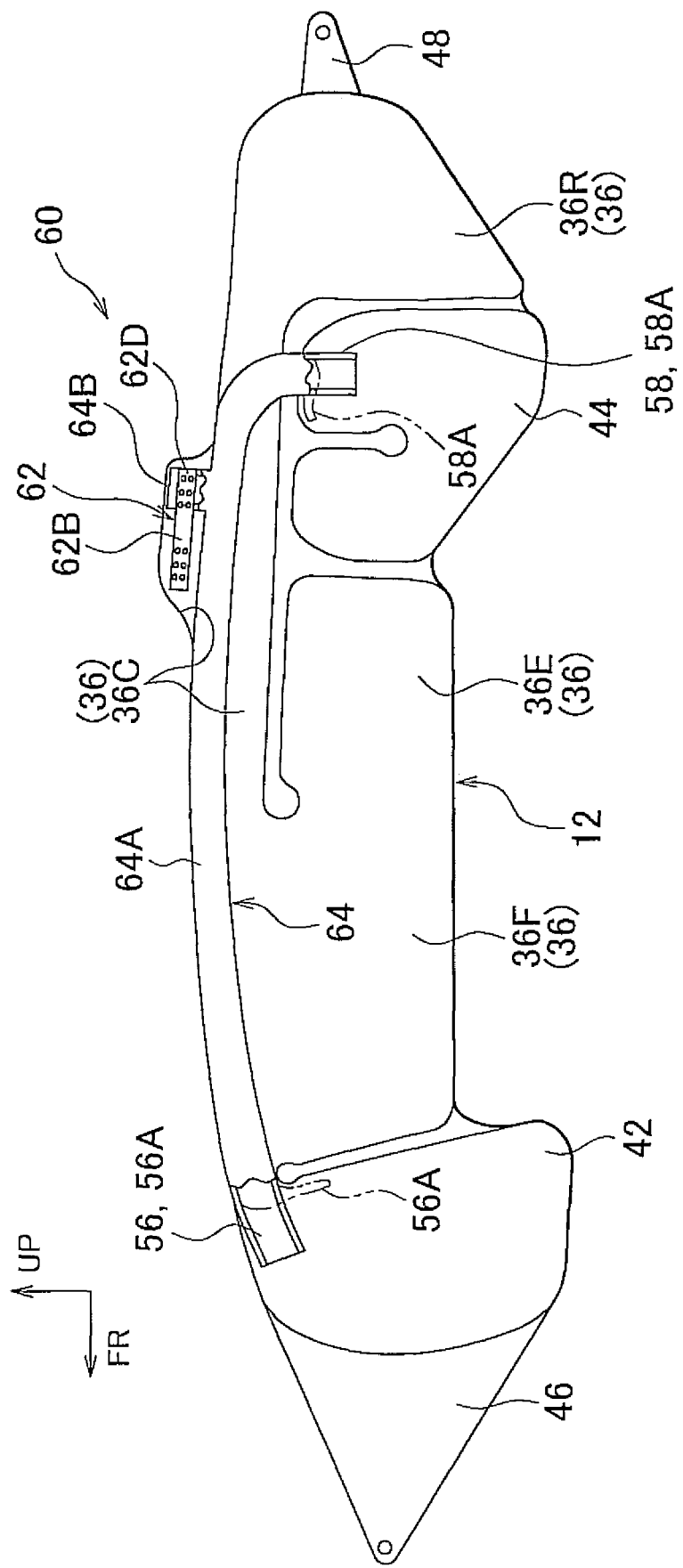
FIG. 9 is a sectional view schematically showing the internal structure of a curtain airbag of the curtain airbag apparatus of the second example embodiment of the invention.
Figure 10:
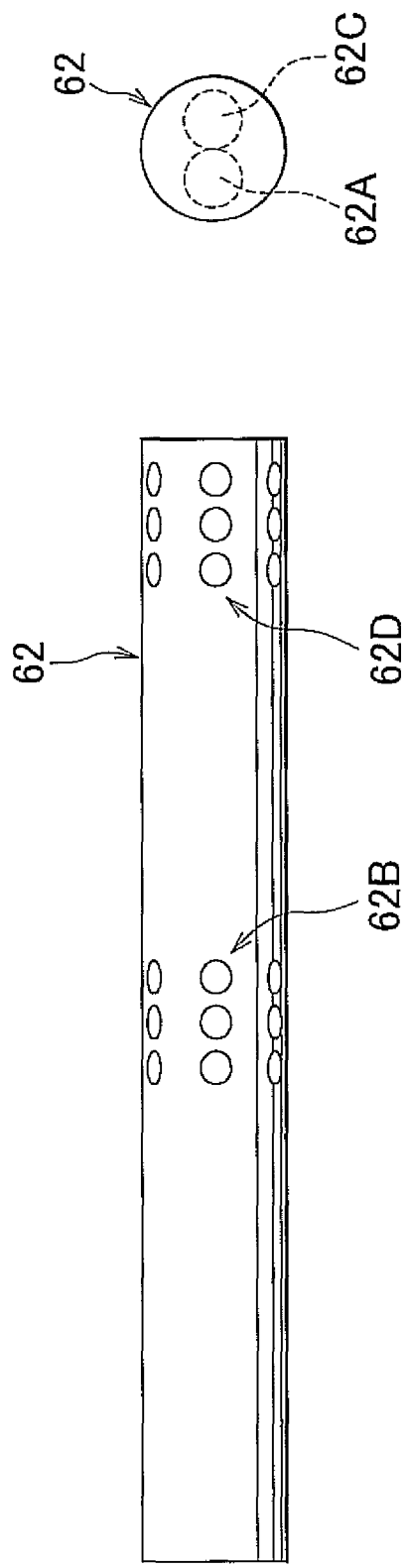
FIG. 10A is a side view of an inflator of the curtain airbag apparatus of the second example embodiment of the invention.
FIG. 10B is a front view of the inflator shown in FIG. 10A.

Referring to FIG. 9, the inner tube 64 is provided in the communication portion 36C of the curtain airbag 12. The inner tube 64 longitudinally extends along the roof-side portion 18, and its front end is at the rear side of the upper portion of the front secondary chamber 42 while the rear end is at the upper side of the rear secondary chamber 44. The inner tube 64 has a gas outlet portion 64B protruding from a tube body 64A of the inner tube 64. The second gas discharge holes 62D of the inflator 62 are located in the gas outlet portion 64B. Further, the front secondary gas discharge portion 56 from which to discharge the gas into the front secondary chamber 42 is provided at the front end of the tube body 64A of the inner tube 64, while the rear secondary gas discharge portion 58 from which to discharge the gas into the rear secondary chamber 44 is provided at the rear end of the tube body 64A of the inner tube 64.

The front secondary chamber 42 and the front primary chamber 36F are partitioned off from each other by the inner tube 64 (the front secondary gas discharge portion 56) attached on the inner side of the communication portion 36C by sewing, for example. Likewise, the rear secondary chamber 44 and the rear primary chamber 36R are partitioned off from each other by the inner tube 64 (the rear secondary gas discharge portion 58) attached on the inner side of the communication portion 36C by sewing, for example.

According to the structure described above, in the curtain airbag 12, the gas generated through activation of the second ignition portion 62C of the inflator 62, which serves as "gas generator" in the invention, is fed (distributed) to the front secondary chamber 42 and the rear secondary chamber 44 through the inner tube 64. The amount of the gas thus fed to the front secondary chamber 42 and the rear secondary chamber 44 is set, in relation to the capacities of the front secondary chamber 42 and the rear secondary chamber 44, such that the internal pressures of the front secondary chamber 42 and the rear secondary chamber 44 become higher than the internal pressures of the respective primary chambers 36 inflated by the gas fed from the inflator 62 as a result of the ignition of the first ignition portion 62A, which is ignited first (i.e., in the first stage of ignition of the inflator 62). According to the second example embodiment, as such, the second ignition portion 62C and second gas discharge holes 62D of the inflator 62, the inner tube 64, the front secondary gas discharge portion 56, and the rear secondary gas discharge portion 58 together serve as "second gas feed portion" in the invention.

Further, the vehicle airbag system 60 has the one-way valve 56A provided at the front secondary gas discharge portion 56 and the one-way valve 58A provided at the rear secondary gas discharge portion 58. Thus, as in the case of the vehicle airbag system 10 of the first example embodiment, the decreases in the internal pressures of the front secondary chamber 42 and the rear secondary chamber 44 are minimized. In the second example embodiment, the gas distribution structure including the inflator 62 and the inner tube 64 serves as "internal pressure difference creator" in the invention.

In the second example embodiment, when receiving a side collision detection signal, the airbag ECU 34 first activates the first ignition portion 62A of the inflator 62 at the near side. Therefore, upon a side collision of the motor vehicle S, the gas is first fed to the primary chambers 36 of the curtain airbag 12 only so that they inflate and thereby deploy, and thereafter the airbag ECU 34 activates the second ignition portion 62C of the inflator 62 at the near side such that the deployments of the front secondary chamber 42 and the rear secondary chamber 44 are completed at the time point t5 that is approximately 1.5 sec after the input of the side collision detection signal, that is, the airbag ECU 34 activates the second ignition portion 62C of the inflator 62 immediately before approximately 1.5 sec passes from the input of the side collision detection signal. Accordingly, even in a case where the motor vehicle S rolls over after collided sideways, the passengers can be protected by the front secondary chamber 42 and the rear secondary chamber 44 that start deploying after the primary chambers 36 as described above.

Meanwhile, when receiving a rollover detection signal after a side collision detection, signal, the airbag ECU 34 activates the first ignition portion 62A and the second ignition portion 62C of the inflator 62 at the far side. When receiving a rollover detection signal only, the airbag ECU 34 activates the first ignition portions 62A and second ignition portions 62C of the inflators 62 at the respective lateral sides (i.e., the near side and far side) almost simultaneously.

The timing of activation of the inflator 28 by the airbag ECU 34 in the second example embodiment is the same as, or substantially the same as the timing of activation of the inflator 28 by the airbag ECU 34 in the first example embodiment. Other structural elements and features of the vehicle airbag system 60, including those not shown in the drawings, are the same as, or substantially the same as the corresponding structural elements and features of the vehicle airbag system 10 of the first example embodiment described above.

Figure 11:
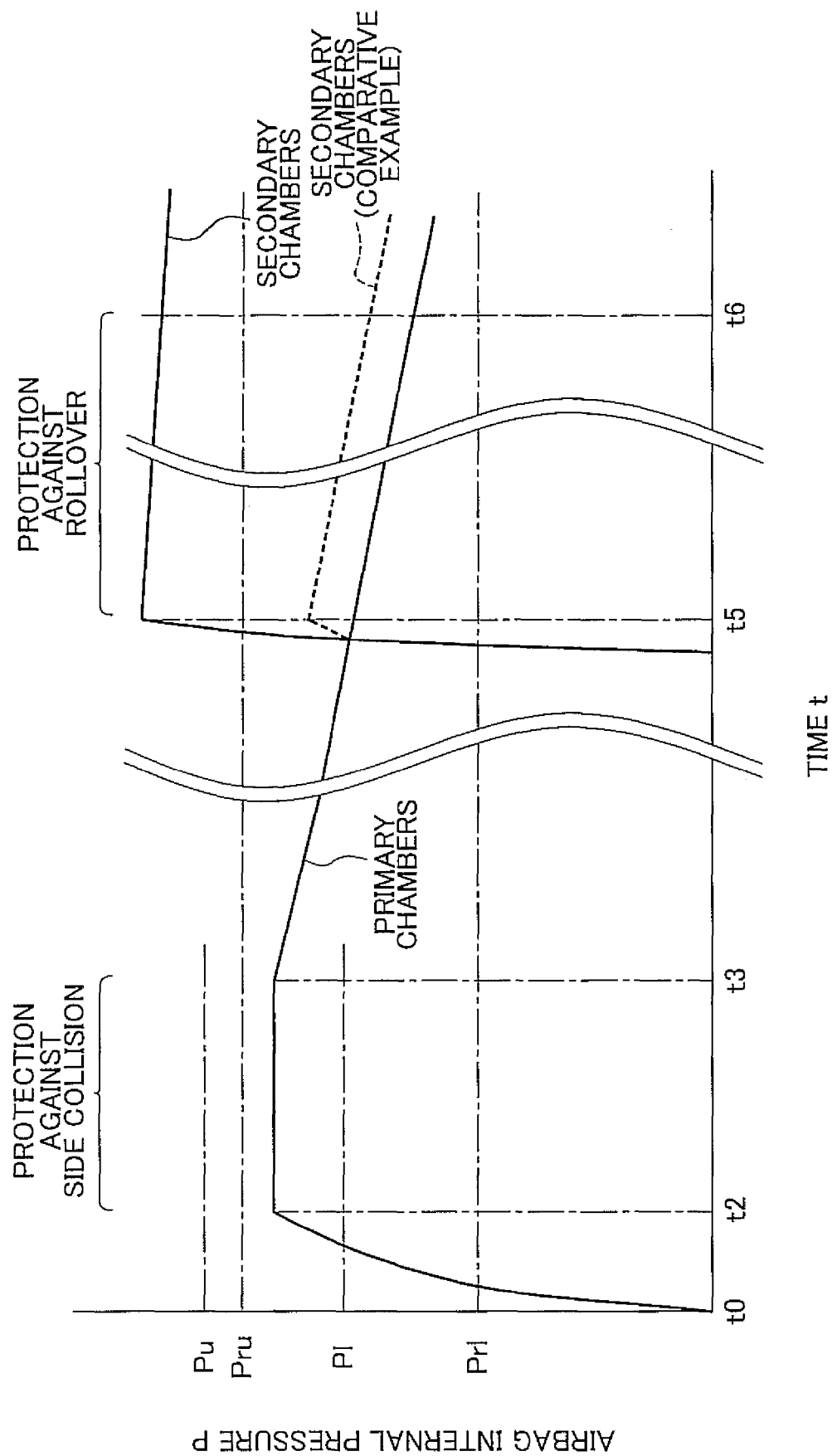
FIG. 11 is a chart illustrating the deployment timing of a side airbag of a vehicle airbag system of the second example embodiment of the invention.

Next, the effects and advantages of the second example embodiment will be described focusing on the differences from those of the first example embodiment. The timing chart of FIG. 11 illustrates the deployment timings of the primary deployment portions 36, the front secondary chamber 42, and the rear secondary chamber 44. It is to be noted that the timing chart of FIG. 11 only schematically illustrates the deployment timings of the respective chambers and the changes in their internal pressures, that is, it does not illustrate the actual deployment timings and internal pressure changes. Further, it is to be noted that the timing chart of FIG. 11 does not include any illustration on the operation of the side airbag 22 (the inflator 28) and the following descriptions do not refer to it to avoid repetition.

According to the vehicle airbag system 60 structured as described above, upon a side collision of the motor vehicle S incorporating the vehicle airbag system 60, the airbag ECU 34 receives a side collision detection signal from the side collision sensor 30 and then activates the first ignition portion 62A of the inflator 62 at the near side (the time point t0). At this time, as shown in FIG. 11, the primary chambers 36 first deploy and their deployments are completed at the time point t2, so that the heads of the respective passengers at the near side are protected by the respective primary chambers 36 of the curtain airbag 12. The passenger protection against the side collision is completed until the time point t3. Since the internal pressures of the respective primary chambers 36 are, after their deployments are completed, kept between the lower limit internal pressure Pl and the upper limit internal pressure Pu, the heads of the respective passengers are moderately, and properly, restricted, and thus are effectively protected.

Further, the airbag ECU 34 activates the second ignition portion 62C of the inflator 62 at the near side immediately before approximately 1.5 sec passes from the input of the side collision detection signal. Further, if a rollover detection signal is further input in this state, the airbag ECU 34 additionally activates the first ignition portion 62A and the second ignition portion 62C of the inflator 62 at the far side. As such, the primary chambers 36, the front secondary chamber 42, and the rear secondary chamber 44 of the curtain airbag 12 at the near side and those of the curtain airbag 12 at the far side all complete their deployments at the time point t5 from which the protections against the rollover of the motor vehicle S are required. At this time, the internal pressures of the front secondary chamber 42 and the rear secondary chamber 44 of each curtain airbag 12 are higher than the internal pressures of the respective primary chambers 36.

Accordingly, the amount of movement of the head of each passenger toward the corresponding laterally outer side of the motor vehicle S can be reduced by the left and right curtain airbags 12 (i.e., the primary chambers 36, the front secondary chamber 42, and the rear secondary chamber 44 of each curtain airbag 12). That is, the passengers are protected from the rollover impacts. According to the vehicle airbag system 60, at this time, the internal pressures of the front secondary chamber 42 and the rear secondary chamber 44 are high, and therefore when the heads of the respective passengers hit the front secondary chamber 42 and the rear secondary chamber 44, the amounts of movements of their heads toward the laterally outer side are significantly reduced by the front secondary chamber 42 and the rear secondary chamber 44 being supported by the reactive forces from where the front secondary chamber 42 and the rear secondary chamber 44 contact the respective side door portions, as in the case of the vehicle airbag system 10 of the first example embodiment described above.

Accordingly, as is the vehicle airbag system 10 of the first example embodiment, the vehicle airbag system 60 of the second example embodiment is capable of effectively protecting the passengers upon a rollover, as well as effectively protecting the heads of the respective passengers upon a side collision, and further the required entire capacity of each curtain airbag 12 is relatively small.

In addition, since the vehicle airbag system 60 is provided with the two-stage-ignition inflator 62, in other words, since the gas supply source and gas distribution path for the front secondary chamber 42 and the rear secondary chamber 44 and those for the primary chambers 36 are different, the front secondary chamber 42 and the rear secondary chamber 44 can be activated at a desired time point after the start of deployments of the respective primary chambers 36 (i.e., after the first ignition portion 62A is activated). Further, since the gas generated as a result of activation of the second ignition portion 62C of the inflator 62 is fed exclusively to the front secondary chamber 42 and the rear secondary chamber 44, their internal pressures can be made sufficiently higher than those of the primary chambers 36.

Figure 12:
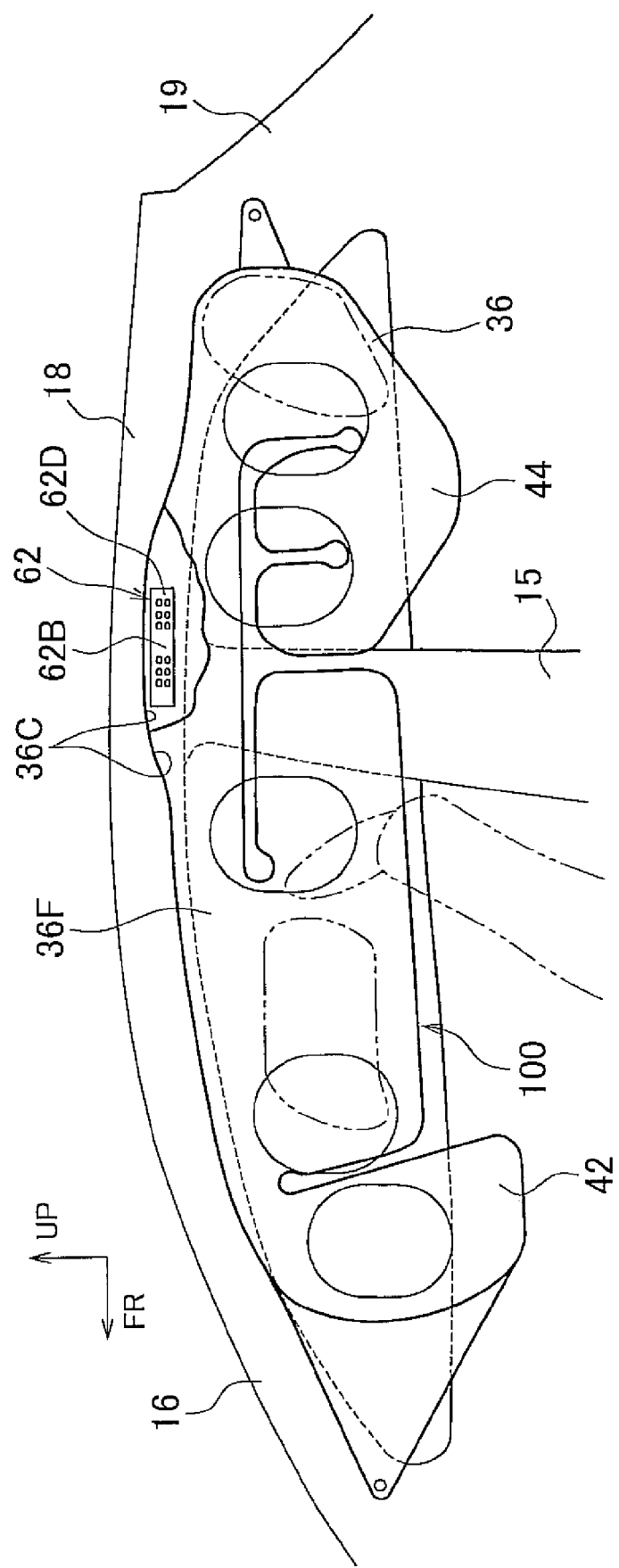
FIG. 12 is a side view illustrating the outline of the overall structure of a curtain airbag apparatus of a comparative example for the second example embodiment of the invention, as seen from the passenger compartment of the vehicle.

For example, referring to FIG. 12, in a curtain airbag apparatus 100 as a comparative example, the primary chambers 36, the front secondary chamber 42, and the rear secondary chamber 44 are in communication with each other and the first gas discharge holes 62B and the second gas discharge holes 62D are both located in the communication portion 36C. According to this comparative example thus structured, in a case where the first ignition portion 62A is activated in response to an input of a side collision detection signal and then the second ignition portion 62C is activated approximately 1.5 sec after the input of the side collision detection signal, the gas generated as a result of the activation of the second ignition portion 62C is fed to all the portions of the curtain airbag 12, and therefore the internal pressures of the front secondary chamber 42 and the rear secondary chamber 44 cannot be increased up to the predetermined internal pressure Pru, as indicated by the dotted line in FIG. 11.

According to the vehicle airbag system 60 of the second example embodiment of the invention, in contrast, the gas generated as a result of the activation of the second ignition portion 62C of the inflator 62 is exclusively fed to the front secondary chamber 42 and the rear secondary chamber 44 via the inner tube 64, and therefore the internal pressures of the front secondary chamber 42 and the rear secondary chamber 44 can be increased beyond the predetermined internal pressure Pru, as shown in FIG. 11, using the gas of an amount that is significantly smaller than the gas amount that would be required to increase the internal pressure of the entire curtain airbag 12 up to the predetermined internal pressure Pru or higher.

According to the vehicle airbag apparatus 60 of the second example embodiment of the invention, further, the activation of the second ignition portion 62C is timed with respect to the time point t5 at which to start the protections against a rollover, as described above. With regard to this, for example, if the vehicle airbag system 60 was adapted to activate the second ignition portion 62C at the same time as the first ignition portion 62A, it would result in a possibility that the internal pressures of the front secondary chamber 42 and the rear secondary chamber 44 decrease during the period from the completion of the protection against a side collision (the time point t3) to the beginning of the protection against a rollover (the time point t5), to such an extent that the internal pressures of the front secondary chamber 42 and the rear secondary chamber 44 are lower than the predetermined internal pressure Pru at the time point t5 from which the protections against the rollover are required. According to the vehicle airbag system 60 of the second example embodiment of the invention, the activation of the second ignition portion 62C is timed with respect to the time point t5, and therefore the decreases in the internal pressures of the front secondary chamber 42 and the rear secondary chamber 44 are minimized during the time period from the time point t3 to the time point t5. Further, due to the one-way valve 56A provided at the front secondary gas discharge portion 56 and the one-way valve 58A provided at the rear secondary gas discharge portion 58, the internal pressures of the front secondary chamber 42 and the rear secondary chamber 44 are maintained high for a long period of time.

Accordingly, as shown in FIG. 11, the internal pressures of the front secondary chamber 42 and the rear secondary chamber 44 decrease more slowly in time than those of the primary chambers 36 do, and therefore the internal pressure Pr that needs to be set for the initial deployment stage so as to achieve the predetermined internal pressure Pru required for the proper protections against rollovers can be set low, and this also contributes to reduce the required capacities of the front secondary chamber 42 and the rear secondary chamber 44, thus, the required capacity of the curtain airbag 12 (the inflator 62).

While each of the front secondary chamber 42 and the rear secondary chamber 44 that are adapted to deploy up to an internal pressure higher than those up to which the primary chambers 36 deploy serves as "second deployment portion" in the invention in the foregoing example embodiments, the invention is not limited to this. That is, for example, "second deployment portion" in the invention may be provided in various other forms, arrangements, or the like. For example, only one of the front secondary chamber 42 and the rear secondary chamber 44 may be adapted to serve as "second deployment portion" in the invention, depending upon the form of each vehicle.

Further, while the invention is applied, by way of example, to the motor vehicle S having the rear seats Sr and the rear side doors 27 in the foregoing example embodiments, the invention is not limited to such applications. That is, for example, the invention may be applied also to a two-door motor vehicle having no rear side door, a two-seater motor vehicle having no rear seat, and a motor vehicle having seats in three rows or more.

Further, while the front secondary chamber 42 and the rear secondary chamber 44 are partitioned off from the primary chambers 36 in the forgoing example embodiments, the invention is not limited to this. That is, for example, the primary chambers 36, the front secondary chamber 42, and the rear secondary chamber 44 may be formed and arranged such that the front secondary chamber 42 and the rear secondary chamber 44 are supplied with the gas from the respective primary chambers 36. In this case, for example, the front secondary chamber 42 and the rear secondary chamber 44 may communicate with the respective primary chambers 36 via passages that are narrowed so as to retard the deployments of the secondary chamber 42 and the rear secondary chamber 44 with respect to those of the primary chambers 36, or via passages at which one-way valves are provided, respectively, to inhibit the gas from flowing back to the primary chambers 36 from the front secondary chamber 42 and the rear secondary chamber 44, respectively.

Further, while the two-stage-ignition inflator 62 is used in the second example embodiment, the invention is not limited to this. For example, two inflators that operate interpedently may be used such that one of them feeds the gas to the primary chambers 36 and the other feeds the gas to the front secondary chamber 42 and rear secondary chamber 44 (the inner tube 64).

The invention has been described with reference to the example embodiments for illustrative purposes only. It should be understood that the description is not intended to be exhaustive or to limit form of the invention and that the invention may be adapted for use in other systems and applications. The scope of the invention embraces various modifications and equivalent arrangements that may be conceived by one skilled in the art.

What is claimed is:

1. A curtain airbag apparatus comprising:
   a curtain airbag that is embedded, in a folded or rolled state, in an upper edge portion of at least one door opening of a vehicle body and deploys into a form of a curtain, the curtain airbag having a first deployment portion that deploys toward a lower side of a vehicle from the upper edge portion of the vehicle by inflating with gas supplied upon a side collision of the vehicle and upon a rollover of the vehicle, and a second deployment portion that deploys toward the lower side of the vehicle from the upper edge portion of the door opening by inflating with gas supplied at least upon a rollover of the vehicle, such that the second deployment portion is located in an area that does not overlap, as viewed laterally, an area in which the first deployment portion is located, the second deployment portion deploys into an elongated generally columnar shape, the generally columnar shape having an axis the extends substantially vertically when viewed laterally on the vehicle, the second deployment portion having an upper edge and a lower edge, as viewed laterally, the upper edge of the secondary deployment portion overlaps a front pillar of the vehicle, the lower edge of the secondary deployment portion is located lower than a beltline of the vehicle, the lower edge overlapping a front portion of a front side door of the vehicle;
   a gas generator that generates the gas to be fed to the first deployment portion and the second deployment portion; and
   an internal pressure difference creator that makes an internal pressure of the second deployment portion higher than an internal pressure of the first deployment portion at least upon a rollover of the vehicle.

2. The curtain airbag apparatus according to claim 1, wherein
   the internal pressure difference creator is provided with a first gas feed portion via which the gas generator feeds the gas to the first deployment portion and a second gas feed portion via which the gas generator feeds the gas to the second deployment portion and at which a gas flow resistance is lower than a gas flow resistance at the first gas feed portion.

3. The curtain airbag apparatus according to claim 1, wherein
   the gas generator is provided with a first gas generation portion that generates the gas to be fed to the first deployment portion and a second gas generation portion that generates the gas to be fed to the second deployment portion, and
   the internal pressure difference creator is provided with a first gas feed portion via which the gas is, upon a side collision of the vehicle and upon a rollover of the vehicle, fed to the first deployment portion from the first gas generation portion and a second gas feed portion via which the gas, upon a rollover of the vehicle, is fed to the second deployment portion from the second gas generation portion such that the internal pressure of the second deployment portion becomes higher than the internal pressure of the first deployment portion.

4. The curtain airbag apparatus according to claim 3, wherein upon a side collision of the vehicle, the second gas generation portion is activated a predetermined time after the first gas generation portion is activated.

5. The curtain airbag apparatus according to claim 1, wherein
the first deployment portion deploys to an area on an outer side, in a lateral direction of the vehicle, of a head of a passenger, and the second deployment portion deploys to an area in front of the first deployment portion.

6. The curtain airbag apparatus according to claim 1, wherein
the first deployment portion deploys to an area on an outer side, in a lateral direction of the vehicle, of a head of a passenger, and a rear deployment portion that deploys so as to overlap a middle pillar of the vehicle, as viewed laterally, is provided at or on a rear side of the first deployment portion.

7. The curtain airbag apparatus according to claim 1, wherein
the first deployment portion deploys to an area on an outer side, in a lateral direction of the vehicle, of a head of a passenger, and
a delayed-deployment portion is provided which deploys, with a time lag from the first deployment portion, to an area below the first deployment portion by being supplied with gas from the first deployment portion via a narrowed passage, such that the delayed-deployment portion overlaps, as viewed laterally, a side door of the vehicle and an upper portion of a side airbag.

8. A curtain airbag apparatus comprising:
a curtain airbag that is embedded, in a folded or rolled state, in an upper edge portion of at least one door opening of a vehicle body and deploys into a form of a curtain, the curtain airbag having a first deployment portion that deploys toward a lower side of a vehicle from the upper edge portion of the vehicle by inflating with gas supplied upon a side collision of the vehicle and upon a rollover of the vehicle, and a second deployment portion that deploys toward the lower side of the vehicle from the upper edge portion of the door opening by inflating with gas supplied at least upon a rollover of the vehicle, such that the second deployment portion is located in an area that does not overlap, as viewed laterally, an area in which the first deployment portion is located, the second deployment portion deploys into an elongated generally columnar shape, the generally columnar shape having an axis the extends substantially vertically when viewed laterally on the vehicle, the second deployment portion having an upper edge and a lower edge, as viewed laterally, the upper edge of the secondary deployment portion overlaps a front pillar of the vehicle, the lower edge of the secondary deployment portion is located lower than a beltline of the vehicle, the lower edge overlapping a front portion of a front side door of the vehicle;
a gas generator that generates gas upon a side collision of the vehicle and upon a rollover of the vehicle; and
a first gas feed passage via which the gas generator feeds the gas to the first deployment portion; and
a second gas feed passage via which the gas generator feeds the gas to the second deployment portion and which is larger in cross-sectional passage area than the first gas feed passage.

9. The curtain airbag apparatus according to claim 8, wherein
the first deployment portion deploys to an area on an outer side, in a lateral direction of the vehicle, of a head of a passenger, and the second deployment portion deploys to an area in front of the first deployment portion.

10. The curtain airbag apparatus according to claim 8 wherein
the second gas feed passage has a one-way valve that allows gas to be fed to the second deployment portion via the second gas feed passage, and that inhibits gas from being discharged from the second deployment portion via the second gas feed passage.

11. The curtain airbag apparatus according to claim 10 wherein:
the second gas feed passage includes a tubular piece via which the gas generator feeds the gas to the second deployment portion, the tubular piece is folded or rolled together with the first deployment portion and the second deployment portion; and
the one-way valve is formed by a downstream end portion of the tubular piece being put into the second deployment portion.

12. The curtain airbag apparatus according to claim 10 wherein
the first gas feed passage and the second gas feed passage are defined by a tubular piece, and the first deployment portion and the second deployment portion are partitioned off from each other and communicate with each other via the tubular piece.

13. The curtain airbag apparatus according to claim 8, wherein
the first deployment portion deploys to an area on an outer side, in a lateral direction of the vehicle, of a head of a passenger, and a rear deployment portion that deploys so as to overlap a middle pillar of the vehicle, as viewed laterally, is provided at or on a rear side of the first deployment portion.

14. The curtain airbag apparatus according to claim 8, wherein
the first deployment portion deploys to an area on an outer side, in a lateral direction of the vehicle, of a head of a passenger, and a delayed-deployment portion is provided which deploys, with a time lag from the first deployment portion, to an area below the first deployment portion by being supplied with gas from the first deployment portion via a narrowed passage, such that the delayed-deployment portion overlaps, as viewed laterally, a side door of the vehicle and an upper portion of a side airbag.

15. A curtain airbag apparatus comprising:
a curtain airbag that is embedded, in a folded or rolled state, in an upper edge portion of at least one door opening of a vehicle body and deploys into a form of a curtain, the curtain airbag having a first deployment portion that deploys toward a lower side of a vehicle from the upper edge portion of the vehicle by inflating with gas supplied upon a side collision of the vehicle and upon a rollover of the vehicle, and a second deployment portion that deploys toward the lower side of the vehicle from the upper edge portion of the door opening by inflating with gas supplied at least upon a rollover of the vehicle, such that the second deployment portion is located in an area that does not overlap, as viewed laterally, an area in which the first deployment portion is located;
a first gas generation portion that generates, upon a side collision of the vehicle and upon a rollover of the vehicle, the gas to be fed to the first deployment portion; and
a second gas generation portion that generates, upon a rollover of the vehicle, the gas to be fed to the second deployment portion such that an internal pressure of the second deployment portion becomes higher than an internal pressure of the first deployment portion.

16. The curtain airbag apparatus according to claim 15, wherein
upon a side collision of the vehicle, the second gas generation portion is activated a predetermined time after the first gas generation portion is activated.

17. The curtain airbag apparatus according to claim 15, wherein
the first deployment portion deploys to an area on an outer side, in a lateral direction of the vehicle, of a head of a passenger, and the second deployment portion deploys to an area in front of the first deployment portion such that a lower end portion of the second deployment portion overlaps a side door of the vehicle, as viewed laterally.

18. The curtain airbag apparatus according to claim 17, wherein
the first deployment portion deploys to an area on the outer side, in the lateral direction of the vehicle, of a head of a passenger on a front seat of the vehicle, and the second deployment portion deploys to an area in front of the first deployment portion such that an upper end portion of the second deployment portion overlaps a front pillar of the vehicle, as viewed laterally.

19. The curtain airbag apparatus according to claim 15, wherein
the first deployment portion deploys to an area on an outer side, in a lateral direction of the vehicle, of a head of a passenger, and a rear deployment portion that deploys so as to overlap a middle pillar of the vehicle, as viewed laterally, is provided at or on a rear side of the first deployment portion.

20. The curtain airbag apparatus according to claim 15, wherein
the first deployment portion deploys to an area on an outer side, in a lateral direction of the vehicle, of a head of a passenger, and a delayed-deployment portion is provided which deploys, with a time lag from the first deployment portion, to an area below the first deployment portion by being supplied with gas from the first deployment portion via a narrowed passage, such that the delayed-deployment portion overlaps, as viewed laterally, a side door of the vehicle and an upper portion of a side airbag.

* * * * *